(12) United States Patent
Yamaji

(10) Patent No.: US 9,027,956 B2
(45) Date of Patent: May 12, 2015

(54) AIRBAG DEVICE

(75) Inventor: Naoki Yamaji, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/979,963

(22) PCT Filed: Jan. 18, 2012

(86) PCT No.: PCT/JP2012/050941
§ 371 (c)(1),
(2), (4) Date: Aug. 14, 2013

(87) PCT Pub. No.: WO2012/099156
PCT Pub. Date: Jul. 26, 2012

(65) Prior Publication Data
US 2013/0313809 A1      Nov. 28, 2013

(30) Foreign Application Priority Data

Jan. 21, 2011   (JP) .................................. 2011-011388

(51) Int. Cl.
| | | |
|---|---|---|
| B60R 21/2338 | (2011.01) | |
| B60R 21/233 | (2006.01) | |
| B60R 21/203 | (2006.01) | |
| B60R 21/2346 | (2011.01) | |
| B60R 21/239 | (2006.01) | |

(52) U.S. Cl.
CPC .............. *B60R 21/233* (2013.01); *B60R 21/203* (2013.01); *B60R 21/2338* (2013.01); *B60R 21/2346* (2013.01); *B60R 21/239* (2013.01); *B60R 2021/23382* (2013.01); *B60R 2021/23324* (2013.01)

(58) Field of Classification Search
CPC ........... B60R 2021/23324; B60R 2021/23332; B60R 21/233; B60R 21/231; B60R 21/239
USPC .................................... 280/729, 743.1, 743.2
See application file for complete search history.

(56) References Cited

U.S. PATENT DOCUMENTS

| | | | |
|---|---|---|---|
| 6,247,727 B1 * | 6/2001 | Hamada et al. ............ 280/743.2 |
| 6,398,258 B2 * | 6/2002 | Hamada et al. ............ 280/743.1 |
| 6,428,041 B1 * | 8/2002 | Wohllebe et al. ............. 280/736 |

(Continued)

FOREIGN PATENT DOCUMENTS

| | | |
|---|---|---|
| DE | 102008028389 A1 | 12/2009 |
| EP | 1747951 A1 | 1/2007 |

(Continued)

OTHER PUBLICATIONS

Communication dated May 15, 2014, issued by the European Patent Office in corresponding Application No. 12736486.7.

*Primary Examiner* — James English
(74) *Attorney, Agent, or Firm* — Sughrue Mion, PLLC

(57) ABSTRACT

An object is to prevent an airbag from bursting out toward an occupant and to inflate and deploy the airbag in a stable manner. An inner bag (30A) inflates with gas supplied from an inflator (3). An outer bag (20) inflates with the gas supplied through a flow port (31) in the inner bag (30A). A connecting member (7) is disposed in the inner bag (30A) and connects an inner surface of the inner bag (30A) and a front surface of the outer bag (20). As the outer bag (20) inflates, the connecting member (7) is drawn out of the inflated inner bag (30A), moving the front surface of the outer bag (20) in the occupant direction.

14 Claims, 25 Drawing Sheets

(56) References Cited

U.S. PATENT DOCUMENTS

| | | |
|---|---|---|
| 7,325,830 B2 * | 2/2008 | Higuchi et al. ............... 280/738 |
| 7,503,583 B2 * | 3/2009 | Muller ....................... 280/743.1 |
| 2003/0020264 A1 | 1/2003 | Abe et al. |
| 2007/0024043 A1 * | 2/2007 | Abe ........................... 280/743.2 |
| 2007/0045997 A1 | 3/2007 | Abe et al. |
| 2008/0303256 A1 * | 12/2008 | Williams ..................... 280/742 |

FOREIGN PATENT DOCUMENTS

| | | |
|---|---|---|
| JP | 2002-019568 A | 1/2002 |
| JP | 2003-034208 A | 2/2003 |
| JP | 2007-216943 A | 8/2007 |
| JP | 2007-284026 A | 11/2007 |
| JP | 2007-331658 A | 12/2007 |
| WO | 2008/150578 A1 | 12/2008 |

* cited by examiner

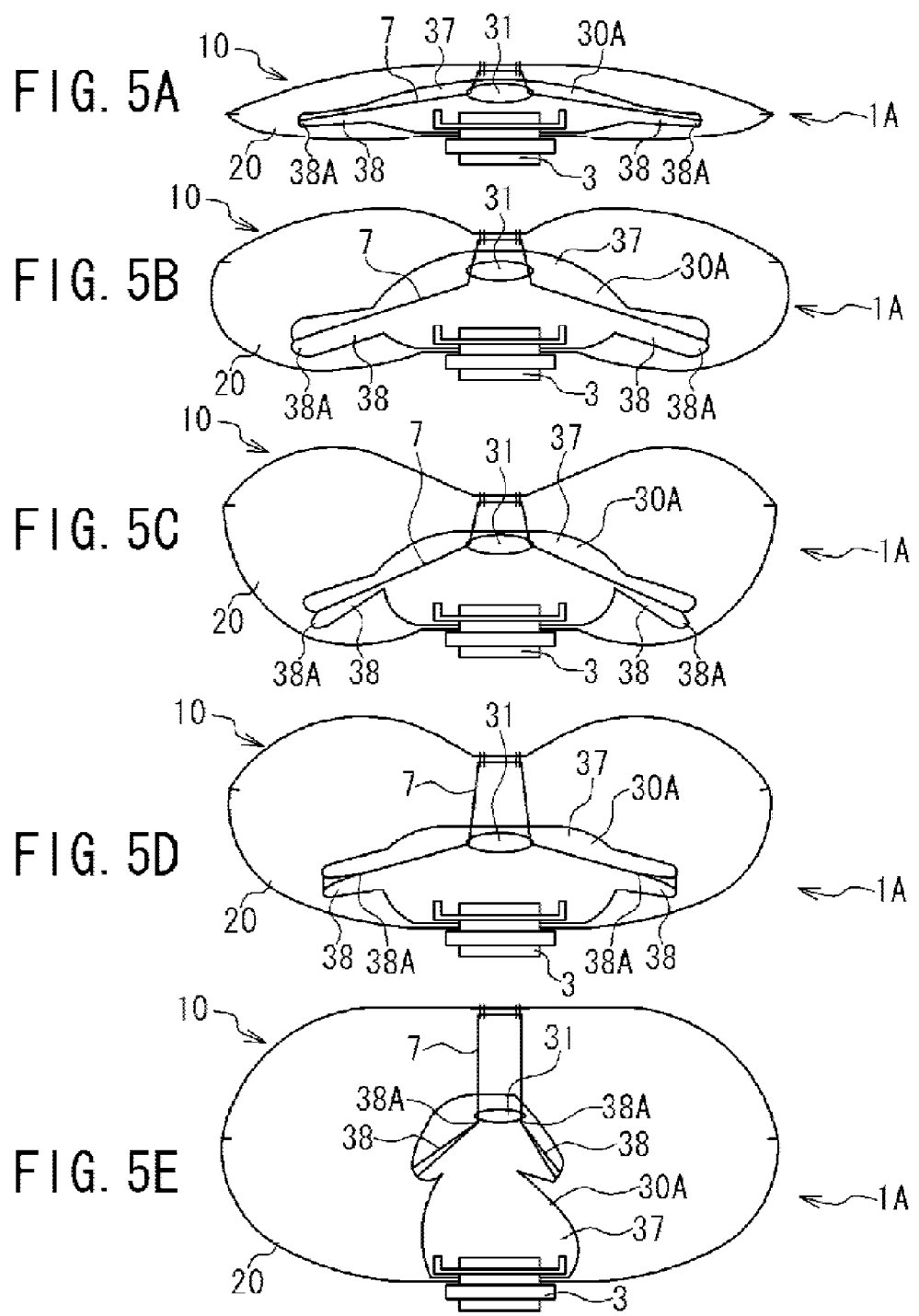

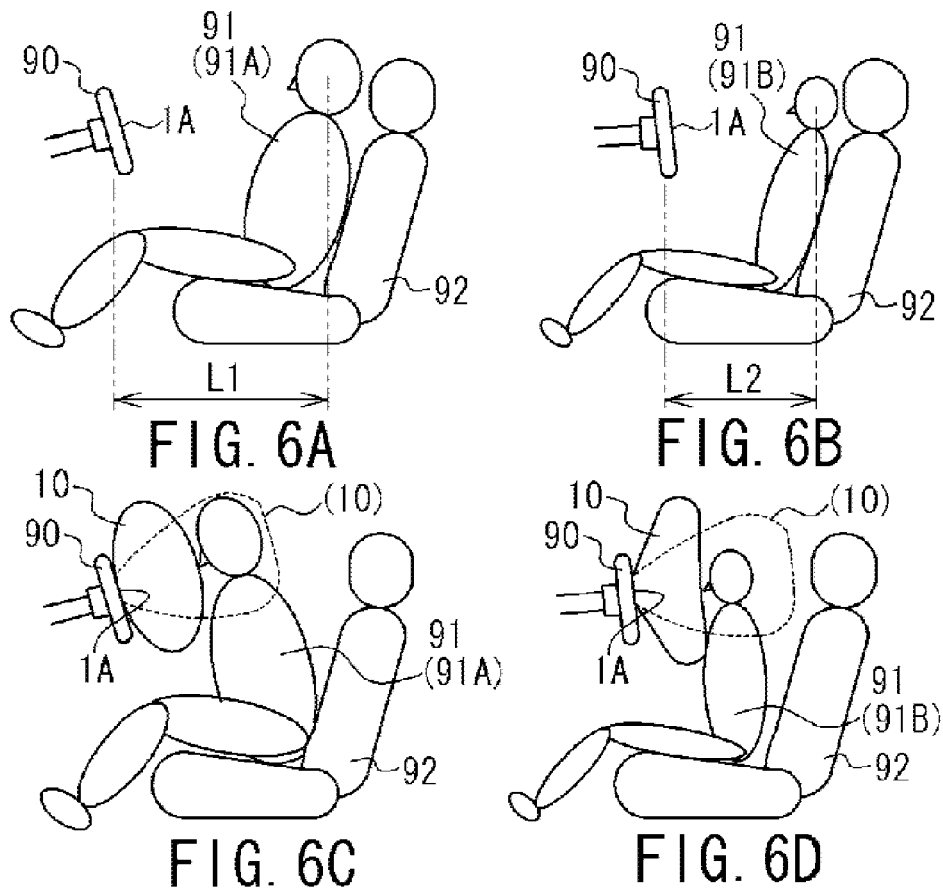
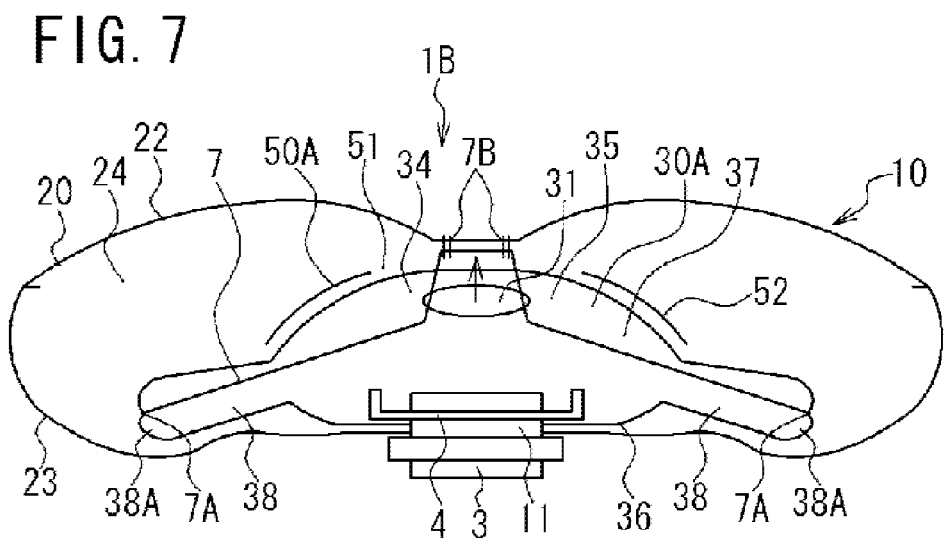

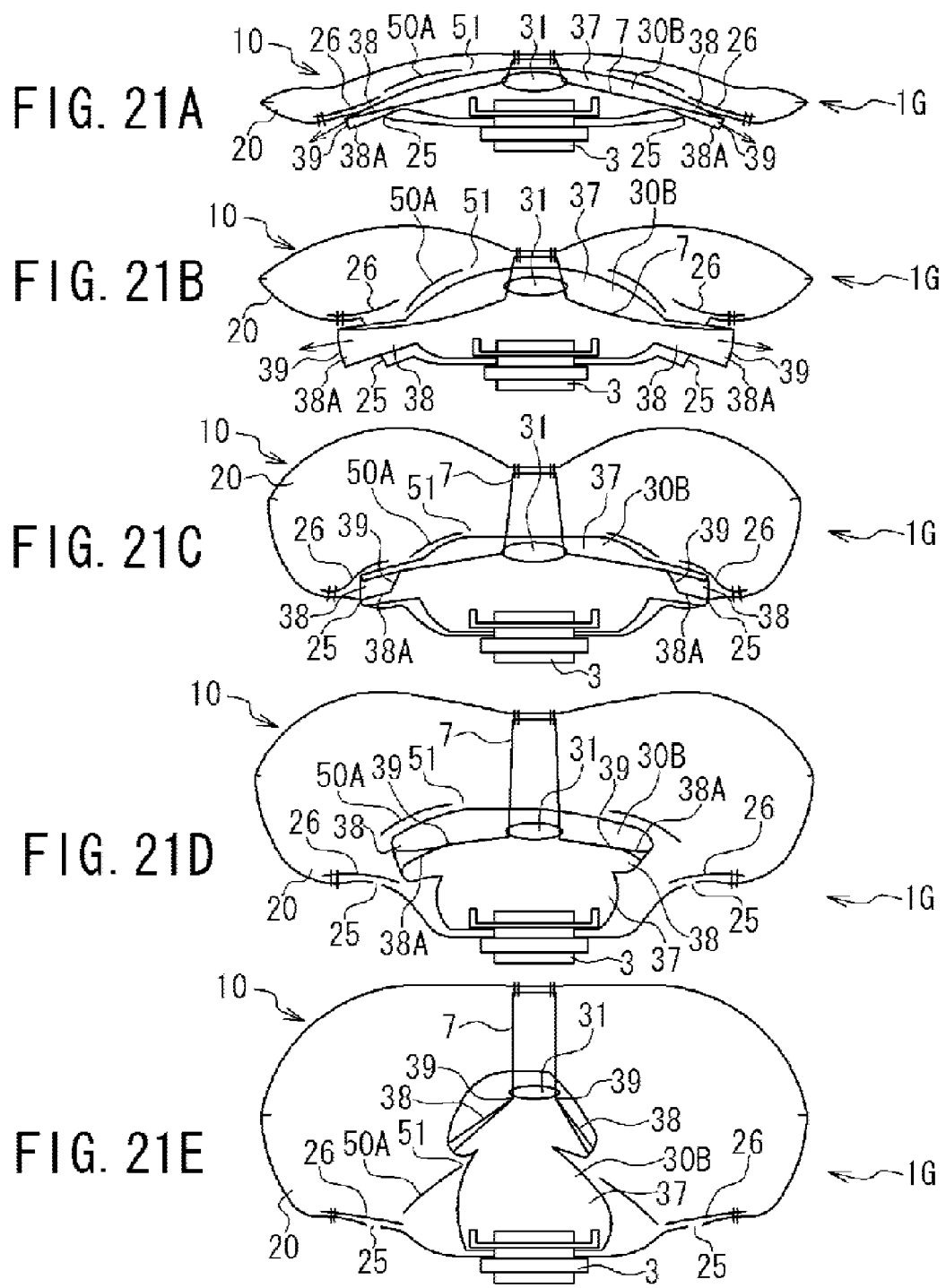

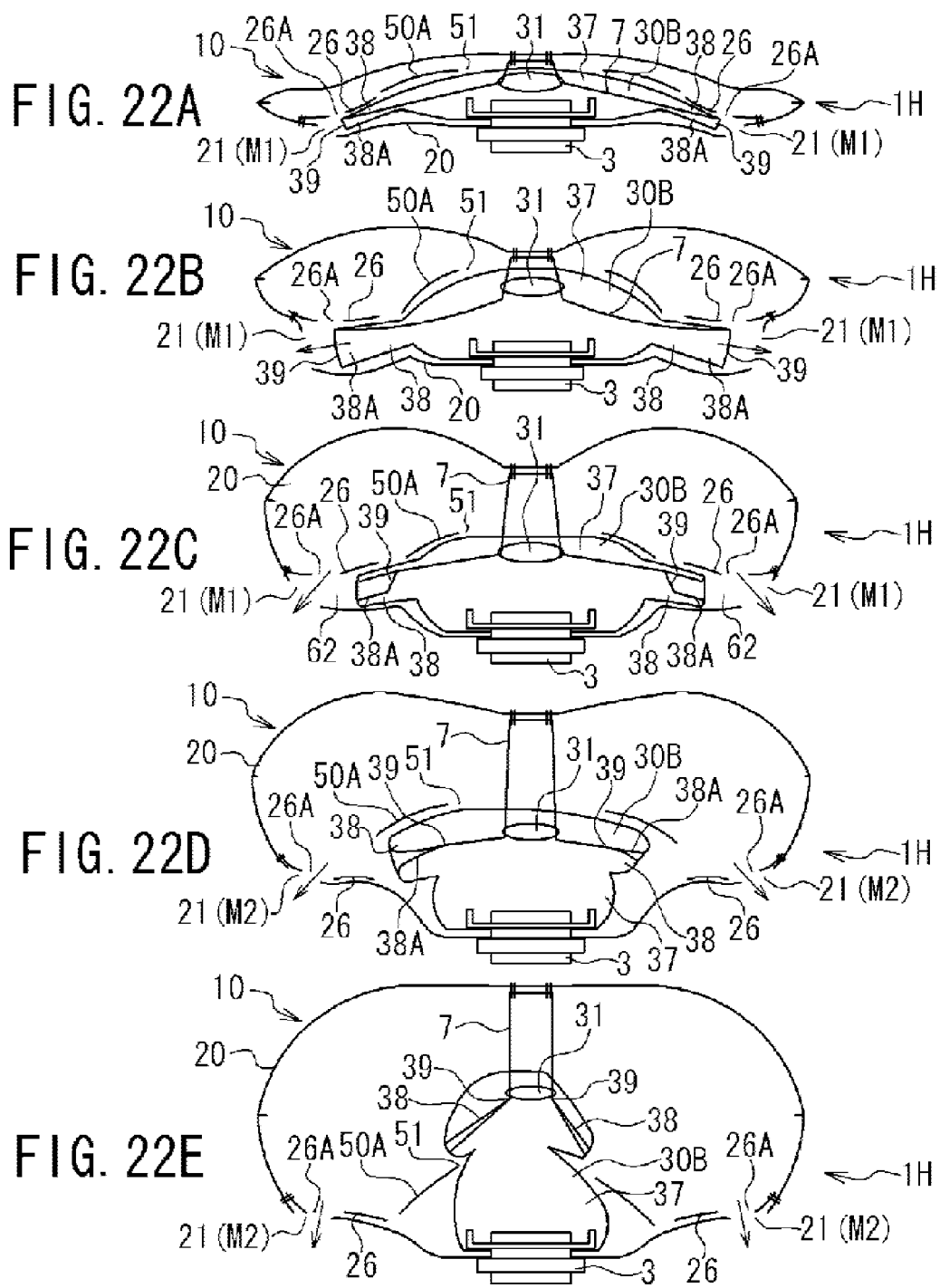

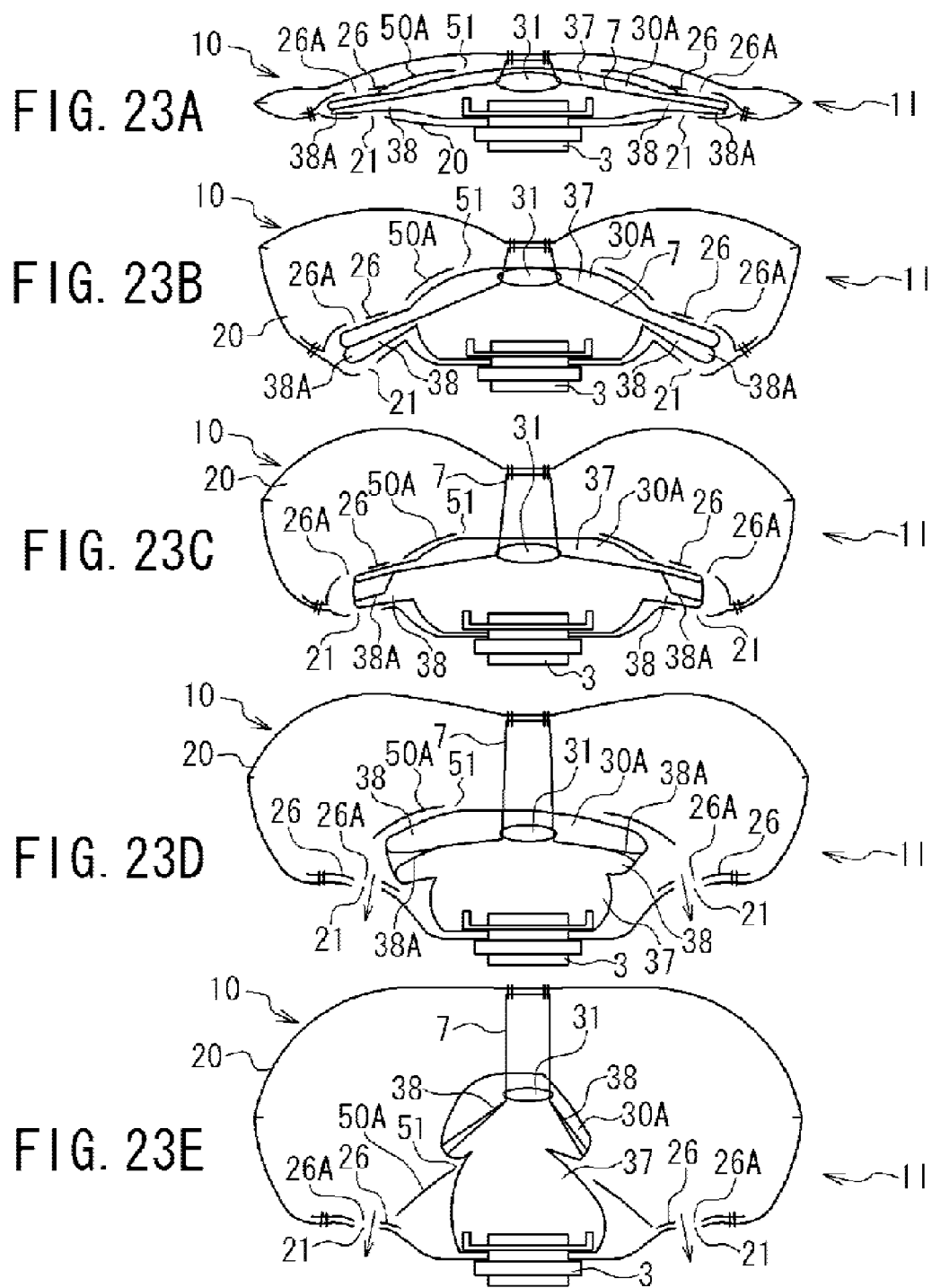

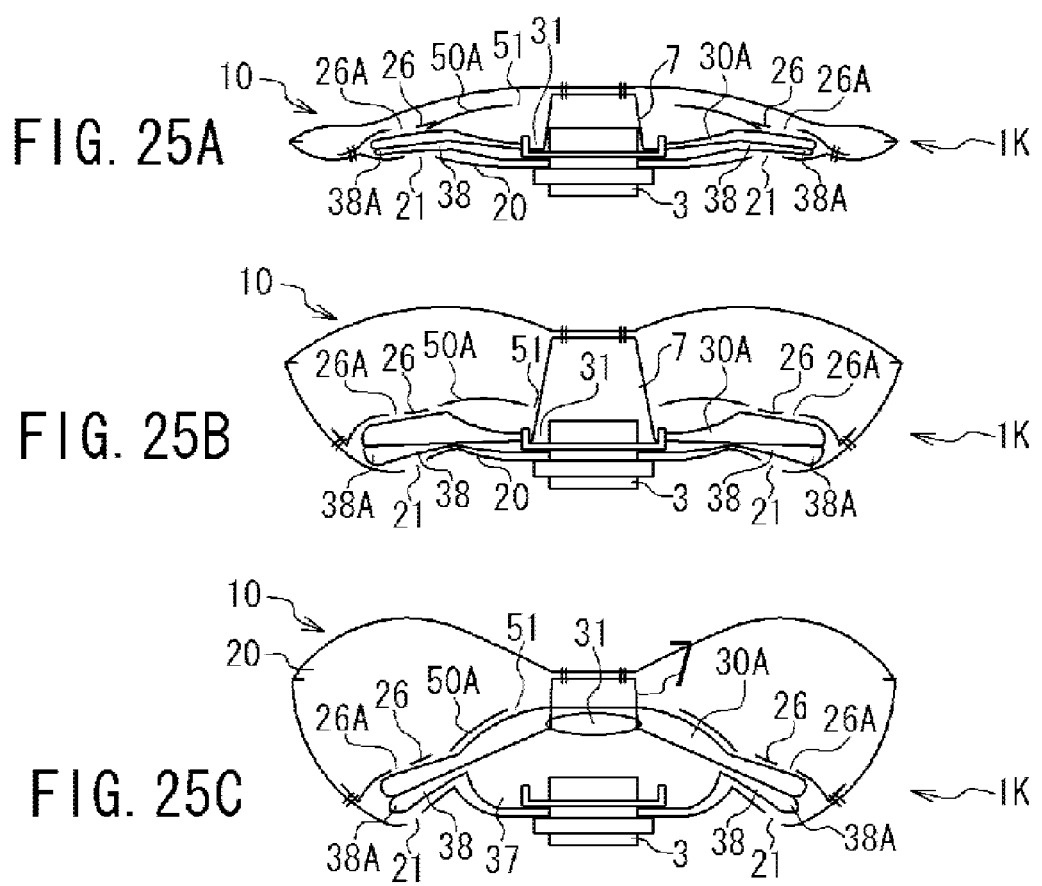

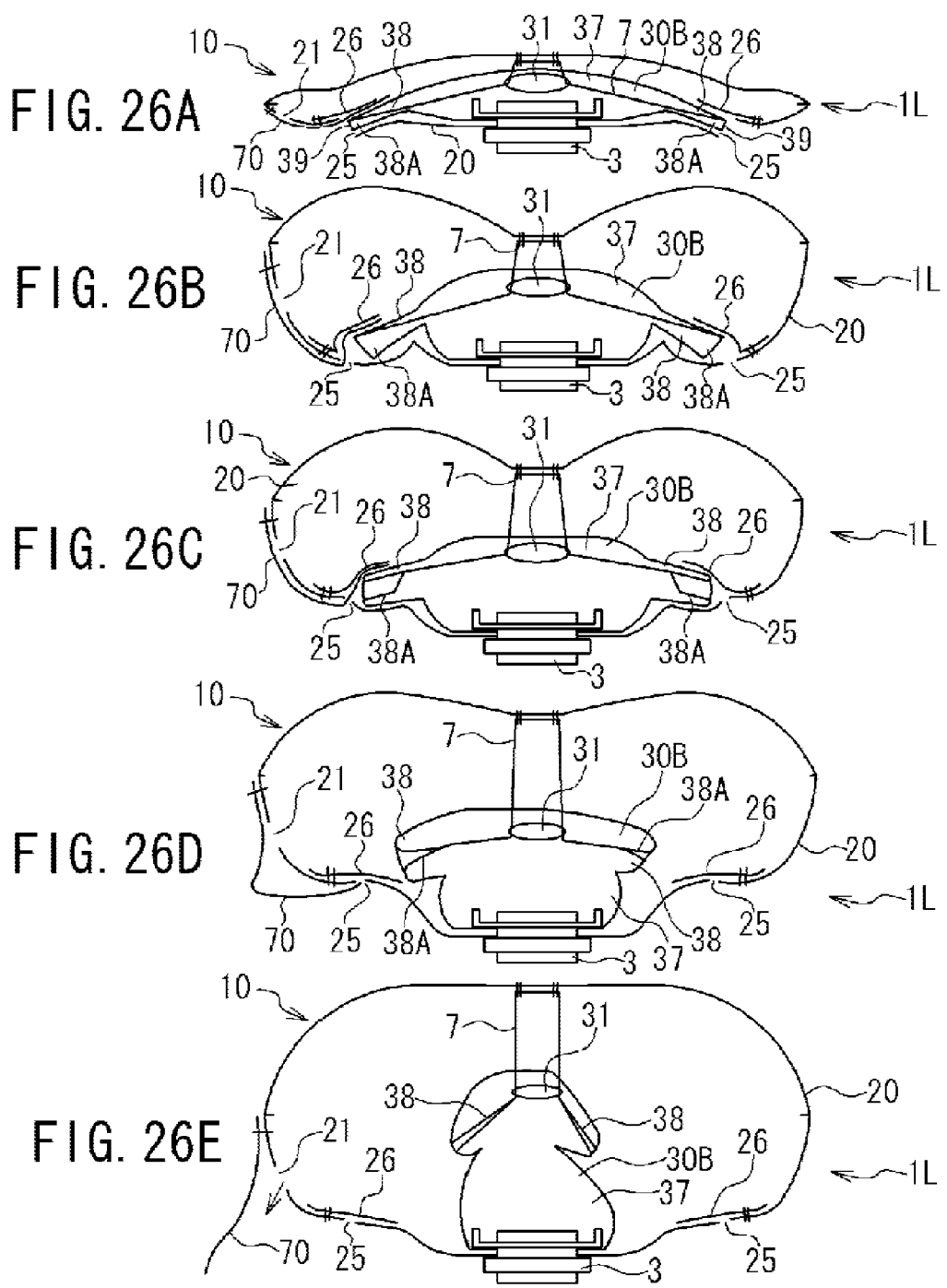

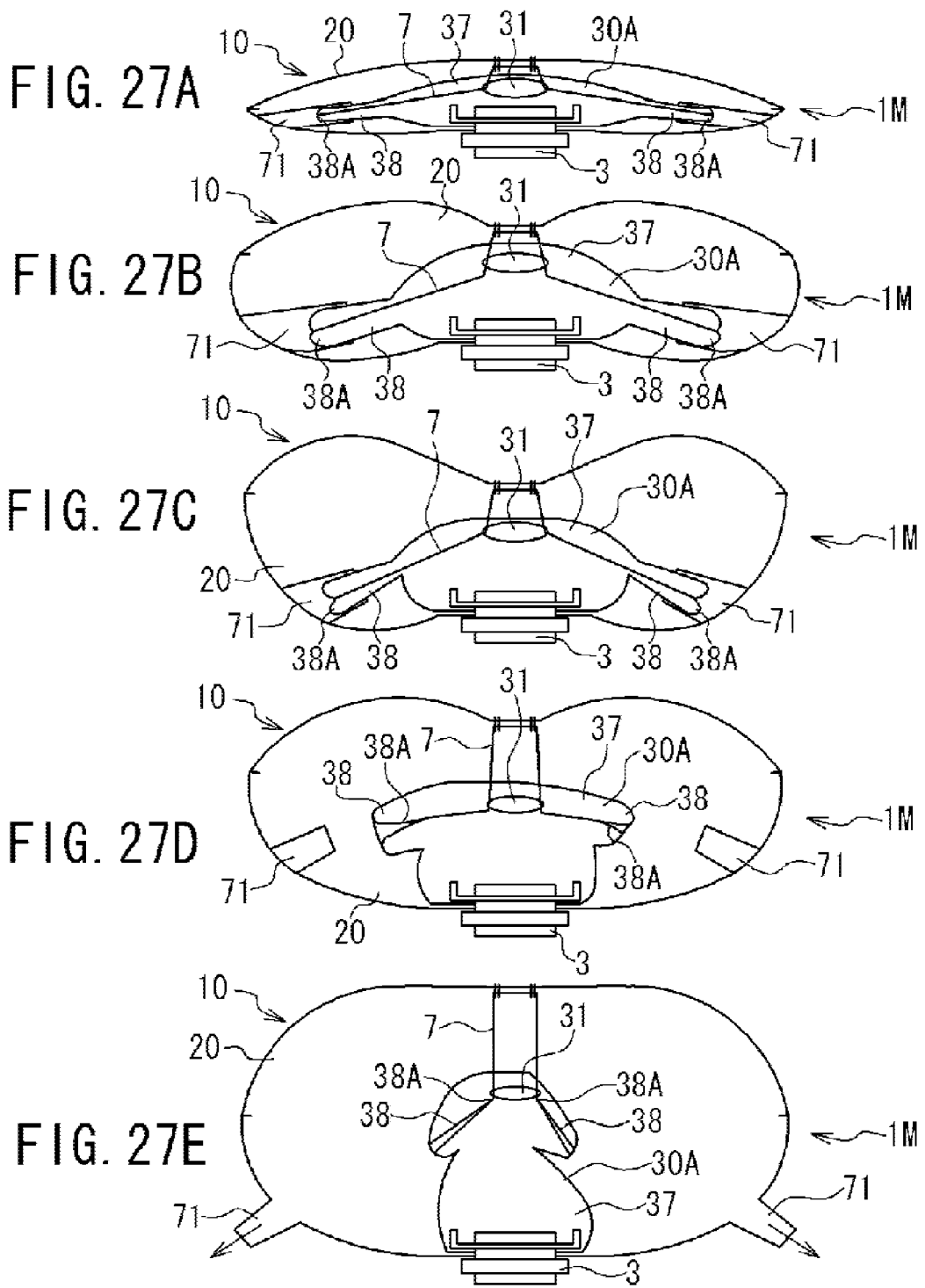

AIRBAG DEVICE

CROSS REFERENCE TO RELATED APPLICATIONS

This application is a National Stage of International Application No. PCT/JP2012/050941 filed Jan. 18, 2012, claiming priority based on Japanese Patent Application No. 2011-011388 filed Jan. 21, 2011, the contents of all of which are incorporated herein by reference in their entirety.

TECHNICAL FIELD

The present invention relates to airbag devices installed in vehicles, such as cars, to protect occupants.

BACKGROUND ART

Airbag devices are used to protect occupants in an emergency or a collision of vehicles. For example, an airbag device attached to a steering wheel inflates and deploys an airbag in front of a driver's seat. An occupant in the driver's seat is received and restrained by the airbag in front of the occupant. In a conventionally known airbag device of this type, the inside of an airbag is divided into a plurality of chambers so that the airbag can quickly deploy sideways (see PTL 1).

In the conventional airbag device, a first chamber is delimited by an inner panel at the center of the airbag, and a second chamber and a third chamber are delimited by separation panels around the first chamber. However, in this airbag device, the second chamber and the third chamber sequentially inflate after the first chamber inflates toward an occupant with high-pressure gas generated by an inflator. Hence, at an early stage of deployment of the airbag, the first chamber may burst out and strike the occupant. This may increase the impact on the occupant. The impact on the occupant is large especially when the occupant is near the steering wheel.

Furthermore, in the conventional airbag device, bursting out of the airbag suddenly stops when the inner panel is fully stretched. The airbag inflates to a thickness corresponding to the length of the inner panel. Therefore, if the inner panel is too long, the distance by which the airbag projects is large, increasing the risk to the occupant. Conversely, if the inner panel is too short, the airbag is thin, failing to receive the occupant. The occupant may collide with the steering wheel. Furthermore, the airbag may bounce as if it expands and contracts in the thickness direction due to a reaction force generated when the inner panel is suddenly stopped.

FIG. 28 includes side views illustrating a bouncing conventional airbag. FIGS. 28A and 28B also illustrate a steering wheel and an occupant colliding with the airbag.

As illustrated in the figure, a conventional airbag 100 may bounce on a steering wheel 90 after it inflates and deploys (arrow W in FIG. 28A). As a result, the shape of the airbag 100 varies between a shape V1 (maximum thickness) and a shape V2 (minimum thickness). Because the shape of the airbag 100 is unstable, the performance of the airbag 100 may be unstable. Furthermore, for example, if an occupant 91 (see FIG. 28B) comes into contact with the airbag 100 in the shape V2 (minimum thickness), the absorbing stroke of the airbag 100 may be insufficient. The absorbing stroke is a stroke of the airbag 100 when absorbing the impact and energy of the occupant 91. Accordingly, from the standpoint of safely restraining the occupant 91, the conventional airbag 100 is required to inflate and deploy in a more stable manner.

Furthermore, in the conventional airbag 100, because a joint portion of the inner panel (not shown) is subjected to a high load, the strength of the joint portion needs to be increased. For example, when the joint is made by stitching, the stitching strength needs to be increased by adding a reinforcing fabric piece, changing the thread size, or changing the stitching shape. Therefore, the conventional airbag 100 has problems of increased manufacturing efforts and costs.

CITATION LIST

Patent Literature

PTL 1: Japanese Unexamined Patent Application, Publication No. 2007-284026

SUMMARY OF INVENTION

Technical Problem

The present invention has been made in view of the above-described conventional problems, and an object thereof is to prevent an airbag from bursting out toward an occupant and to inflate and deploy the airbag in a stable manner. Furthermore, the occupant is safely restrained by the airbag.

Solution to Problem

The present invention provides an airbag device including an airbag that inflates and deploys with gas to protect an occupant in a vehicle; and an inflator that supplies gas to the airbag. The airbag includes an inner bag that inflates with the gas supplied from the inflator and has a gas flow port, an outer bag that accommodates the inner bag and inflates with the gas supplied through the flow port provided in the inner bag, and a connecting member that is disposed in the inner bag and connects an inner surface of the inner bag and a front surface of the outer bag. As the outer bag inflates, the connecting member is drawn out of the inflated inner bag and moves the front surface of the outer bag in an occupant direction.

Advantageous Effects of Invention

The present invention makes it possible to prevent an airbag from bursting out toward an occupant and to inflate and deploy the airbag in a stable manner. Furthermore, the occupant can be safely restrained by the airbag.

BRIEF DESCRIPTION OF DRAWINGS

FIG. 5 includes cross-sectional views illustrating, in sequence, stages of inflation and deployment of the airbag.

FIG. 6 includes side views illustrating the airbag device protecting an occupant.

FIG. 7 illustrates an airbag device according to a second embodiment.

FIG. 21 includes cross-sectional views illustrating, in sequence, stages of inflation and deployment of the airbag.

FIG. 22 includes diagrams illustrating an airbag device according to an eighth embodiment.

FIG. 23 includes diagrams illustrating an airbag device according to a ninth embodiment.

FIG. 25 includes diagrams illustrating an airbag device according to an eleventh embodiment.

FIG. 26 includes diagrams illustrating an airbag device according to a twelfth embodiment.

FIG. 27 includes diagrams illustrating an airbag device according to a thirteenth embodiment.

DESCRIPTION OF EMBODIMENTS

An airbag device according to an embodiment of the present invention will be described below with reference to the drawings.

The airbag device according to this embodiment is disposed in a vehicle and receives an occupant with an inflatable and deployable airbag. The occupant is protected by the airbag. For example, the airbag device is provided around a seat (a driver's seat or a passenger's seat) in a vehicle and protects the occupant seated in the seat. Hereinbelow, a description will be given by taking an airbag device installed in a steering wheel as an example. The steering wheel is located in front of the driver's seat.

Figure 1:
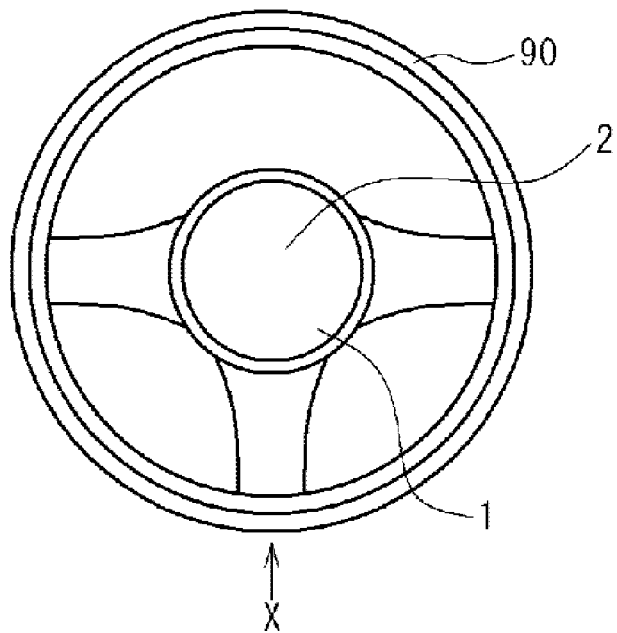
FIG. 1 is a front view illustrating a steering wheel provided with an airbag device.

FIG. 1 is a front view illustrating the steering wheel provided with the airbag device. FIG. 1 illustrates the steering wheel as viewed from the occupant side.

As illustrated in the figure, the airbag device 1 is installed in the central portion of the steering wheel 90 and is located in front of the occupant. The airbag device 1 includes an airbag cover 2 and an airbag (not shown) disposed in the airbag cover 2. The airbag cover 2 covers the surface of the airbag device 1. The airbag is stored, in a folded state, in the airbag cover 2. When inflating, the airbag opens the airbag cover 2 by pushing it and deploys in a vehicle cabin. The airbag inflates and deploys between the steering wheel 90 and the occupant. At this time, the airbag inflates sideways and in a direction where the occupant is located (hereinbelow, "occupant direction"). The airbag deploys so as to cover the steering wheel 90.

First Embodiment

Figure 2:
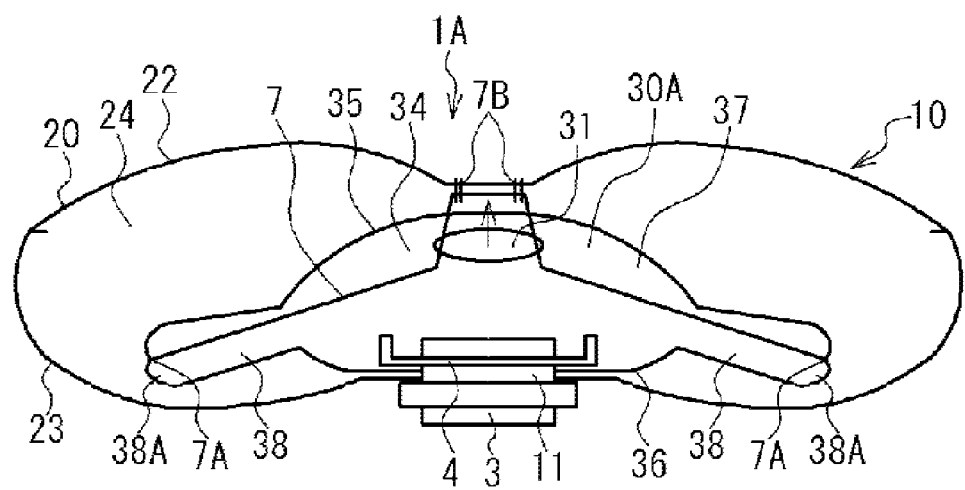
FIG. 2 illustrates an airbag device according to a first embodiment.
Figure 3:
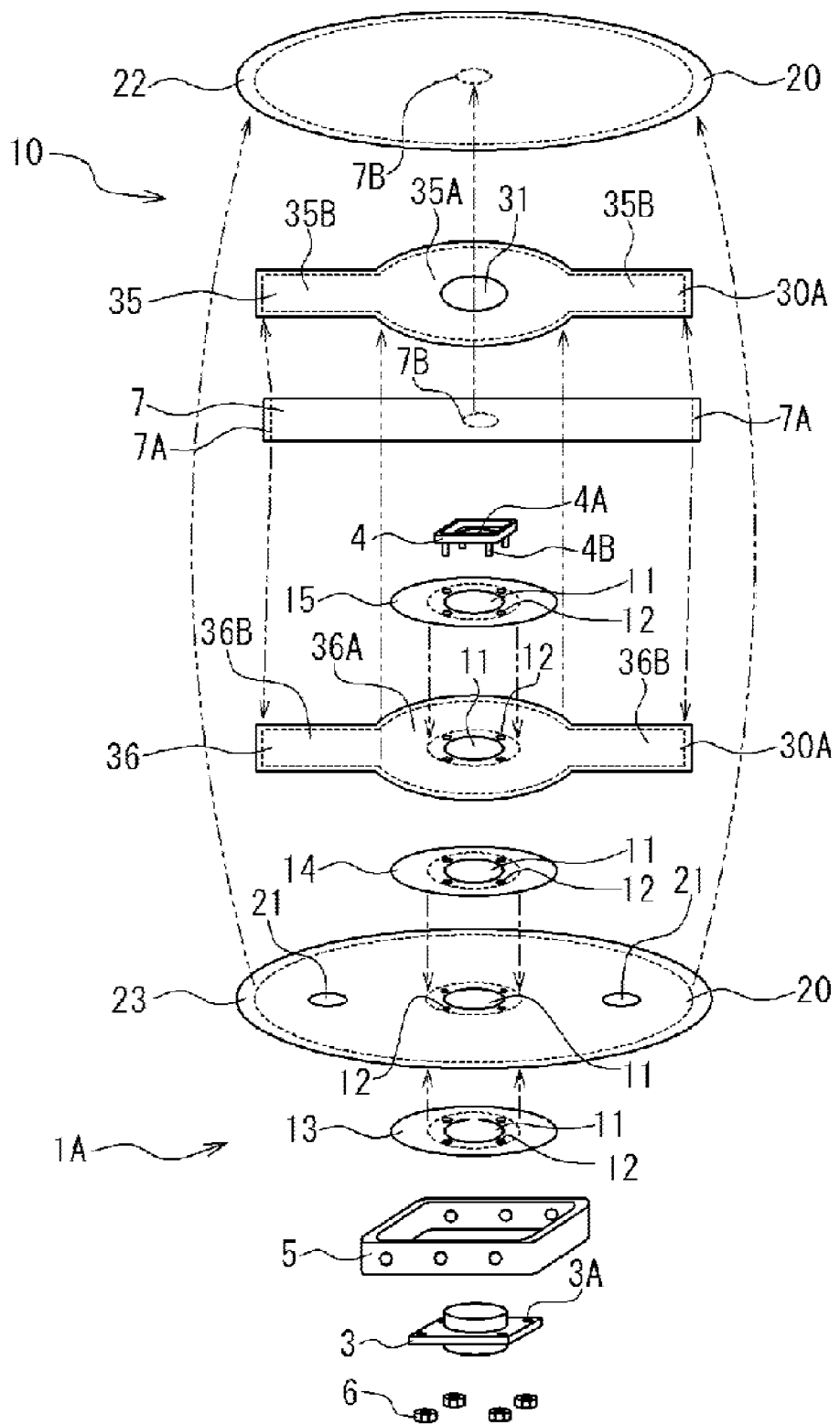
FIG. 3 is an exploded perspective view of the airbag device in FIG. 2.

FIG. 2 illustrates an airbag device 1 according to a first embodiment (hereinbelow, "airbag device 1A"). FIG. 2 schematically illustrates the airbag device 1A as viewed from an arrow X direction in FIG. 1. Furthermore, FIG. 2 illustrates an airbag 10 at an early stage of deployment (inflation) in cross-section. FIG. 3 is an exploded perspective view of the airbag device 1A in FIG. 2. FIG. 3 illustrates components of the airbag device 1A spaced apart in the up-down direction. FIG. 3 also shows, with arrows, the relationship between components to be combined and the positions where the components are to be combined.

As illustrated in the figures, the airbag device 1A includes the airbag 10 that is inflatable and deployable, an inflator 3, a cushion ring 4 disposed in the airbag 10, and a reaction plate 5 (omitted in FIG. 2). The airbag 10 inflates and deploys toward the occupant with the gas supplied from the inflator 3. The airbag 10 protects the occupant in the vehicle.

The inflator 3 is a disk-type gas generator. The inflator 3 has a plurality of gas discharge ports (not shown) in the outer circumference of an end in the thickness direction. The end of the inflator 3 is inserted into the airbag 10 from an attachment opening 11 formed in the airbag 10. In this state, the inflator 3 is attached to the attachment opening 11. In an emergency of the vehicle or when an impact is detected, the inflator 3 generates gas within the airbag 10 and supplies the gas to the airbag 10. At this time, the inflator 3 radially discharges the gas from the plurality of gas discharge ports. The airbag 10 in a predetermined folded shape inflates and deploys with the gas.

The cushion ring 4 has a rectangular plate shape. The cushion ring 4 has a hole 4A at the central portion thereof, into which the inflator 3 is inserted (see FIG. 3). Four bolts 4B are fixed around the hole 4A in the cushion ring 4. The cushion ring 4 fastens the airbag 10 to the reaction plate 5. A portion around the attachment opening 11 in the airbag 10 is sandwiched between the cushion ring 4 and the reaction plate 5. At this time, first, the bolts 4B are inserted into insertion holes 12 provided in the respective components of the airbag 10. The respective components of the airbag 10 are temporarily fastened with the bolts 4B. Next, after the bolts 4B are inserted into attachment holes (not shown) in the reaction plate 5, the inflator 3 is attached to the reaction plate 5. The bolts 4B are inserted into insertion holes 3A in the inflator 3. Next, the bolts 4B are fixed to the reaction plate 5 with locknuts 6. In this way, the cushion ring 4, the airbag 10, and the inflator 3 are fixed to the reaction plate 5.

The reaction plate 5 is formed of a rectangular frame. The cushion ring 4 and the airbag 10 are attached to one side of the reaction plate 5. The inflator 3 is attached to the other side of the reaction plate 5. The folded airbag 10 is disposed within the reaction plate 5. The airbag cover 2 is attached to the reaction plate 5. The airbag 10 is covered by the airbag cover 2. Then, the reaction plate 5 is fixed to the steering wheel 90.

The airbag 10 includes reinforcing fabric pieces 13 and 14, a protection fabric piece 15, and an outer bag 20. Furthermore, the airbag 10 includes an inner bag 30 (hereinbelow, the inner bag according to this embodiment will be denoted by 30A) and a connecting member 7. The inner bag 30A is disposed in the outer bag 20. The connecting member 7 is disposed in the inner bag 30A. The components of the airbag 10 are formed of base fabric pieces, which are formed by cutting, for example, a woven fabric or a sheet. The reinforcing fabric pieces 13 and 14 and the protection fabric piece 15 each have the attachment opening 11 at the center thereof.

The reinforcing fabric pieces 13 and 14 and the protection fabric piece 15 have circular shapes and are disposed at predetermined positions between the cushion ring 4 and the reaction plate 5.

The outer bag 20 and the inner bag 30A constitute an outer inflation portion and an inner inflation portion of the airbag 10, respectively. The cushion ring 4 is inserted into the inner bag 30A through the attachment openings 11 provided in the outer bag 20 and the inner bag 30A. The outer bag 20 and the inner bag 30A are fixed to the reaction plate 5 with the cushion ring 4. Peripheral portions of the attachment openings 11 provided in the outer bag 20 and the inner bag 30A are held between the cushion ring 4 and the reaction plate 5.

The components of the airbag 10 will be described in detail below. Note that, in the present invention, concerning the outer bag 20, the inner bag 30, and the airbag 10, a portion located on the occupant side (i.e., upper side in FIGS. 2 and 3), inside the vehicle, is referred to as a "front surface", and a portion located on the vehicle body side (i.e., lower side in FIGS. 2 and 3) is referred to as a "rear surface". Concerning the outer bag 20 and the inner bag 30 assembled into the airbag 10, a surface located on the outer side is referred to as an "outer surface", and a surface located on the inner side is referred to as an "inner surface".

An end of the inflator 3 is disposed in the inner bag 30A. The inner bag 30A is inflated with the gas supplied from the inflator 3. The front surface of the inner bag 30A has at least one (herein, one) flow port 31. The gas flows through the flow port 31. The inner bag 30A inflates first with the gas from the inflator 3. The inner bag 30A supplies the gas to the outer bag 20 through the flow port 31.

The inner bag 30A includes a front base fabric piece (front panel) 35 constituting the front surface and a rear base fabric piece (rear panel) 36 constituting the rear surface. The base fabric pieces 35 and 36 are formed in the same shape. The base fabric pieces 35 and 36 are formed of circular portions 35A and 36A and at least one (herein, two) rectangular portions 35B and 36B. The two rectangular portions 35B and 36B are provided integrally with the outer circumferences of the circular portions 35A and 36A so as to extend in opposite directions from the circular portions 35A and 36A. The base fabric pieces 35 and 36 are joined together along the outer edges thereof by stitching or by bonding (herein, by stitching). Thus, the circular portions 35A and 36A and the two rectangular portions 35B and 36B are joined together.

The inside and outside of the inner bag 30A are delimited by the base fabric pieces 35 and 36. An air chamber 34 is formed in the inner bag 30A. The inner bag 30A has a ball-shaped inflation portion (main inflation portion) 37 and tubular inflation portions 38. The ball-shaped inflation portion 37 is formed of the circular portions 35A and 36A. The tubular inflation portions 38 are formed of the rectangular portions 35B and 36B. The inside of the ball-shaped inflation portion 37 and the inside of the tubular inflation portions 38 communicate with each other and form the air chamber 34. The gas inside the inner bag 30A flows in the occupant direction through the flow port 31 provided at the center of the front base fabric piece 35 (circular portion 35A). The protection fabric piece 15 is attached to the inner surface of the rear base fabric piece 36. The protection fabric piece 15 is disposed between the rear base fabric piece 36 and the cushion ring 4 to protect the rear base fabric piece 36 from the cushion ring 4. The inflator 3 is attached to the attachment opening 11 provided at the center of the rear base fabric piece 36.

Figure 4A:
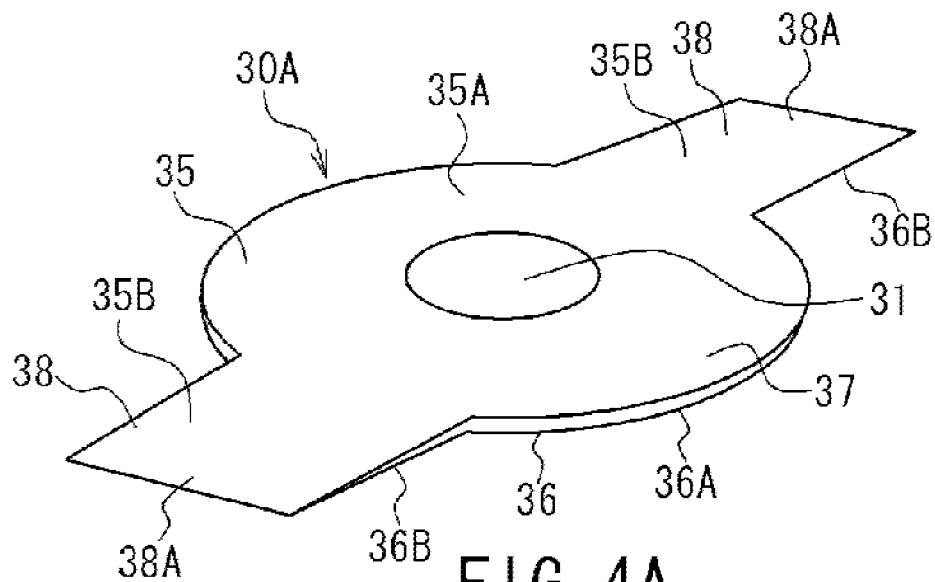
FIG. 4 includes perspective views of an inner bag according to the first embodiment.
Figure 4B:
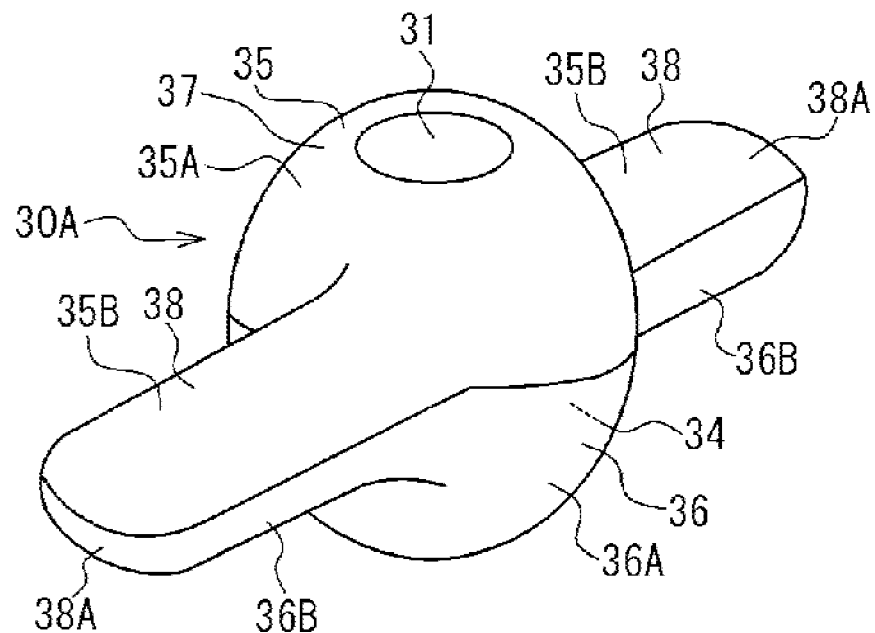

FIG. 4 includes perspective views of the inner bag 30A. FIG. 4A illustrates the inner bag 30A before being inflated. FIG. 4B illustrates the inflated inner bag 30A.

As illustrated in FIG. 4A, the inner bag 30A before being inflated has a flat shape. The front base fabric piece 35 and the rear base fabric piece 36 are stacked on top of each other. As illustrated in FIG. 4B, the inflated inner bag 30A has a three-dimensional shape. The air chamber 34 inside the base fabric pieces 35 and 36 is filled with the gas. At this time, the ball-shaped inflation portion 37 inflates into a ball shape with the gas supplied from the inflator 3, at the center of the inner bag 30A. The tubular inflation portions 38 inflate into a tubular shape with the gas supplied from the ball-shaped inflation portion 37, starting from the ball-shaped inflation portion 37 to the outer side.

As described above, the inner bag 30A has the ball-shaped inflation portion 37 and the tubular inflation portions 38 that are contractible or deformable from the inflated state. At least one tubular inflation portion 38 is provided to the inner bag 30A. When inflated, the tubular inflation portions 38 project outward of the inner bag 30A. In this embodiment, two tubular inflation portions 38 project sideways, in opposite directions, from the inner bag 30A.

The outer bag 20 (see FIGS. 2 and 3) is a circular bag member in front view. Furthermore, the outer bag 20 is a main bag that accommodates the inner bag 30A therein. The outer bag 20 inflates with the gas supplied through the flow port 31 provided in the inner bag 30A. At least one (herein, two) vent hole 21 is provided in the rear surface of the outer bag 20. The gas inside the outer bag 20 is discharged outside the outer bag 20 through the vent holes 21. The outer bag 20 starts to inflate, following the inflation of the inner bag 30A. The outer bag 20 surrounding the inner bag 30A inflates to a larger size than the inner bag 30A.

The outer bag 20 includes a front base fabric piece (front panel) 22 constituting the front surface and a rear base fabric piece (rear panel) 23 constituting the rear surface. The base fabric pieces 22 and 23 are formed in circular shapes having the same diameter and are joined together along the outer circumferences thereof. The inside and outside of the outer bag 20 are delimited by the base fabric pieces 22 and 23. An air chamber 24 is formed in the outer bag 20. The vent holes 21 are provided at two positions in the rear base fabric piece 23, and the gas inside the outer bag 20 is discharged therethrough in a direction where the vehicle body is located (vehicle body direction). The reinforcing fabric pieces 13 and 14 are attached to the inner and outer surfaces of the rear base fabric piece 23. The reinforcing fabric pieces 13 and 14 strengthen the peripheral portion of the attachment opening 11 in the rear base fabric piece 23. The reinforcing fabric pieces 13 and 14 protect the rear base fabric piece 23 from the gas and heat generated by the inflator 3.

The inner bag 30A and the outer bag 20 inflate with the rear surfaces thereof, where the inflator 3 is located, being connected to each other. Furthermore, the inner bag 30A and the outer bag 20 deploy in the occupant direction and sideways, starting from the inflator 3, in front of the occupant. At this time, first, the inner bag 30A accommodating the inflator 3 inflates within the outer bag 20. The entire inner bag 30A inflates and deploys. The outer bag 20 on the outside of the inner bag 30A gradually inflates. At a predetermined time after the inflation of the inner bag 30A has completed, the entire outer bag 20 inflates and deploys. Furthermore, the connection member 7 restricts inflation and deployment of the outer bag 20. The outer bag 20 is unfolded sideways and gradually inflated in the occupant direction.

The connecting member 7 is a tether belt and is disposed in the inner bag 30A. The connecting member 7 is joined to a predetermined position of the inner surface of the inner bag 30A. Furthermore, the connecting member 7 is joined to the front surface of the outer bag 20, at a position within the flow port 31. Thus, the connecting member 7 connects the inner surface of the inner bag 30A and the front surface of the outer bag 20. Before the airbag 10 is inflated, the connecting member 7 is disposed in the inner bag 30A, between the front base fabric piece 35 and the rear base fabric piece 36.

Herein, the connecting member 7 is composed of a belt-shaped member (belt-shaped fabric piece). The connecting member 7 has the same length as the base fabric pieces 35 and 36 constituting the inner bag 30A. The connecting member 7 is disposed so as to extend to the inside of the tubular inflation portions 38. Ends 7A of the connecting member 7 are joined to ends 38A of the tubular inflation portions 38. The connecting member 7 is connected to the front surface of the outer bag 20 (front base fabric piece 22) through the flow port 31 in the inner bag 30A. The connecting member 7 and the front base fabric piece 22 of the outer bag 20 are joined together along a circular stitch line at a connecting portion 7B at the center.

When the airbag 10 is inflated, the inflated inner bag 30A pulls the ends 7A of the connecting member 7. Thus, the connecting member 7 is held inside the inner bag 30A. While the outer bag 20 is inflating, the connecting member 7 applies tension to the connecting portion 7B of the outer bag 20. The connecting member 7 pulls the front surface of the outer bag 20. Thus, the connecting member 7 stops the movement of the front surface of the outer bag 20 in the occupant direction. The connecting member 7 restricts the movement of the front surface of the outer bag 20. Furthermore, as the outer bag 20 inflates, the connecting member 7 is pulled by the front surface of the outer bag 20. The connecting member 7 is gradually drawn out of the inflated inner bag 30A in the occupant direction. The connecting member 7, while being drawn out of the inner bag 30A, gradually moves the front surface of the outer bag 20 in the occupant direction.

In this manner, the connecting member 7 and the inner bag 30A restrict the movement of the front surface of the outer bag 20 in the occupant direction. The restriction on the front surface of the outer bag 20 is centrically applied to the connecting portion 7B at the center. Due to the tension applied by the connecting member 7, inflation and deployment of the outer bag 20 are restricted. The outer bag 20 is unfolded sideways and gradually inflated in the occupant direction. When the outer bag 20 inflates, the connecting member 7 pulls the inner surface of the inner bag 30A, thereby contracting the inner bag 30A. The connecting member 7 is connected to the inside of the tubular inflation portions 38. When drawn out of the inner bag 30A, the connecting member 7 pulls the inflated tubular inflation portions 38. As a result, the connecting member 7 draws the tubular inflation portions 38 into the inner bag 30A, reversing the tubular inflation portions 38.

Next, a manufacturing process of the airbag device 1A (see FIG. 3) will be described.

Concerning the outer bag 20, first, two reinforcing fabric pieces 13 and 14 are stitched to the inner and outer surfaces of the rear base fabric piece 23 (in FIG. 3, dashed lines indicate stitching portions). Next, the base fabric pieces 22 and 23 are stacked such that the outer surfaces thereof are face-to-face, and the base fabric pieces 22 and 23 are stitched together along the outer circumferences thereof. Then, the base fabric pieces 22 and 23 are turned inside out through the attachment opening 11. Note that FIG. 3 illustrates the arrangement of the components after the outer bag 20 and the inner bag 30A are turned inside out.

Concerning the inner bag 30A, first, the protection fabric piece 15 is stitched to the inner surface of the rear base fabric piece 36. Next, the base fabric pieces 35 and 36 are stacked such that the outer surfaces thereof are face-to-face, and the connecting member 7 is disposed on the inner surface of the front base fabric piece 35. The base fabric pieces 35 and 36 are stitched together along their outer edges. At the same time, the ends 7A of the connecting member 7 are stitched to the base fabric pieces 35 and 36. Then, the base fabric pieces 35 and 36 are turned inside out through the attachment opening 11. The connecting member 7 is disposed in the inner bag 30A. The tubular inflation portions 38 are disposed so as to project outward from the inner bag 30A. Then, the inner bag 30A is inserted into the outer bag 20 from the attachment opening 11 in the outer bag 20. The ball-shaped inflation portion 37 and the outer bag 20 are disposed so as to be concentric with each other. The connecting member 7 is stitched to the front base fabric piece 22 of the outer bag 20 at the connecting portion 7B. After the attachment openings 11 and the flow port 31 in the inner bag 30A are positioned, the connecting member 7 and the front base fabric piece 22 are stitched together at a position within the attachment opening 11 and the flow port 31.

Next, the cushion ring 4 is inserted into the inner bag 30A through the attachment opening 11. The inner bag 30A and the outer bag 20 are temporarily fastened with the bolts 4B. The airbag 10, composed of the inner bag 30A and the outer bag 20, is attached to the reaction plate 5 using the cushion ring 4. Next, the inflator 3 is attached to the reaction plate 5. The locknuts 6 are threaded onto the bolts 4B. In this way, the cushion ring 4, the airbag 10, and the inflator 3 are fixed to the reaction plate 5. Next, the airbag 10 is folded and disposed in the reaction plate 5. Note that the airbag 10 may be folded before being fixed to the reaction plate 5.

Finally, the airbag cover 2 (not shown in FIG. 3) is attached to the reaction plate 5. The manufacturing of the airbag device 1A is completed by going through the above-described process. The airbag device 1A is attached to the steering wheel 90 (see FIG. 1). After that, the airbag device 1A activates the inflator 3 in an emergency of the vehicle. The inflator 3 generates gas. The gas unfolds and inflates the airbag 10. The airbag 10 inflates and deploys so as to cover the steering wheel 90.

FIG. 5 includes cross-sectional views illustrating, in sequence, stages of inflation and deployment of the airbag 10. FIG. 5 illustrates the respective stages of the airbag 10 corresponding to FIG. 2.

At an early stage of deployment of the airbag 10, first, the inner bag 30A is inflated with the gas supplied from the inflator 3 (see FIG. 5A). The inner bag 30A is inflated from the ball-shaped inflation portion 37 to the ends 38A of the tubular inflation portions 38 (see FIG. 5B). The connecting member 7 is pulled by the ends 38A, whereby the connecting member 7 is held inside the inner bag 30A. Furthermore, the connecting member 7 applies tension to the front surface of the outer bag 20 to pull the front surface in a direction opposite to the occupant direction (i.e., to the vehicle body direction). The connecting member 7 inhibits movement of the front surface of the outer bag 20 in the occupant direction. As a result, inflation and bursting out of the outer bag 20 in the occupant direction are suppressed. The outer bag 20 inflates more largely sideways than in the occupant direction. Because of the inflation of the outer bag 20, the central portion of the airbag 10 inflates to a predetermined thickness, without bursting out in the occupant direction.

The outer bag 20 starts to inflate with the gas supplied through the flow port 31 provided in the inner bag 30A. At this time, the connecting member 7 restricts inflation of the outer bag 20 in the occupant direction. Thus, the outer bag 20 inflates preferentially sideways and deploys over a wide area so as to extend outward. Furthermore, the outer bag 20 uniformly inflates sideways from the inner bag 30A. Next, as the internal pressure of the outer bag 20 increases, the outer bag 20 inflates in the occupant direction. The thickness of the outer bag 20 increases.

Once the inner bag 30A is completely inflated, it discharges the gas through the flow port 31. The inner bag 30A supplies the gas to the entire outer bag 20. As a result, the internal pressure of the outer bag 20 gradually increases. The pressure difference between the inside and outside of the inner bag 30A decreases. As a result, a force that maintains the rigidity and inflated shape of the inner bag 30A decreases (see FIG. 5C). Furthermore, the inner bag 30A gradually contracts as it discharges the gas. Decreases in volume and outside diameter of the inner bag 30A progress. Meanwhile, the connecting member 7 is pulled by the inflating outer bag 20 in the occupant direction. The connecting member 7 is drawn out of the inner bag 30A through the flow port 31.

The connecting member 7 restricts the movement of the front surface of the outer bag 20 in the occupant direction. The front surface of the outer bag 20 moves in the occupant direction by an amount corresponding to the amount by which the connecting member 7 is drawn out (see FIG. 5D). As a result, the outer bag 20 gradually inflates in the occupant direction. The connecting member 7 pulls the ends 38A of the tubular inflation portions 38, drawing the tubular inflation portions 38 into the inner bag 30A. The tubular inflation portions 38 are deformed as they are drawn into the inner bag 30A and are gradually reversed (see FIG. 5E). The connecting member 7 is drawn out of the inner bag 30A while contracting the tubular inflation portions 38 and the inner bag 30A. The connecting member 7 and the inner bag 30A are stretched between the front and rear surfaces of the outer bag 20. As a result, the outer bag 20 fully inflates and deploys in front of the occupant.

Due to the tension caused by the inflation, deformation of the inner bag 30A and the tubular inflation portions 38 is suppressed. Due to the force that contracts the inner bag 30A and the force that draws in the tubular inflation portions 38, resistance to pulling is added to the connecting member 7. Due to the resistance received from the inner bag 30A, drawing of the connecting member 7 from the inner bag 30A is suppressed. The connecting member 7 is gradually drawn out of the inner bag 30A. As a result, the connecting member 7 gradually moves the front surface of the outer bag 20 while applying tension to the front surface of the outer bag 20. Furthermore, the connecting member 7 and the inner bag 30A function as the tether belt between the front surface and rear surface of the outer bag 20. The connecting member 7 and the inner bag 30A stop the front surface of the outer bag 20. As a result of the inflation of the outer bag 20 being limited by the connecting member 7 and the inner bag 30A, the outer bag 20 inflates to a predetermined thickness. The front surface of the outer bag 20 is disposed at a predetermined position in front of the occupant.

The airbag device 1A receives and protects the occupant with the inflated and deployed outer bag 20 (airbag 10). Herein, the airbag 10 mainly receives and restrains the upper part of the occupant's body. At the same time, the airbag 10 absorbs the impact energy to reduce the impact on the occupant. Furthermore, when receiving the occupant, the airbag 10 discharges the gas through the vent holes 21 in the outer bag 20 to reduce the impact on the occupant.

As has been described above, this airbag device 1A can make the front surface gradually move in the occupant direction by restricting the movement of the front surface of the outer bag 20 with the connecting member 7 and the inner bag 30A. It is also possible to prevent the airbag 10 from bursting out toward the occupant at an early stage of deployment. It is possible to apply stable resistance to the front surface of the outer bag 20 with the connecting member 7 and the inner bag 30A, from an early stage to a final stage of deployment of the outer bag 20. As a result, the front surface of the outer bag 20 moves in a stable manner, enabling the airbag 10 to gradually inflate to a large thickness without causing local bursting out or rapid bursting out. Accordingly, it is possible to prevent the airbag 10 from striking the occupant and to reduce the impact caused when the airbag 10 comes into contact with the occupant. Even when the occupant is located near the steering wheel 90, the impact on the occupant can be considerably reduced.

Because local bursting out of the airbag 10 can be suppressed, the front surface of the airbag 10 can be moved in a relatively flat state. Hence, it is possible to receive the occupant with a large area and to safely restrain the occupant. Because the airbag 10 gradually inflates in the occupant direction, it is possible to suppress expansion and contraction of the airbag 10 in the thickness direction after completion of the inflation. As a result, bouncing of the airbag 10 is suppressed, and hence, it is possible to inflate and deploy the airbag 10 in a stable manner. Because of this, the inflated shape of the airbag 10 and the position of the front surface thereof are stabilized in an early stage. Furthermore, because the performance of the airbag 10 is also stabilized, the airbag 10 can safely restrain the occupant even immediately after it inflates and deploys. Because an effective absorbing stroke of the airbag 10 can be ensured every time when the occupant comes into contact with the airbag 10, the impact and energy of the occupant can be reliably absorbed.

Because the connecting member 7 and the inner bag 30A function as the tether belt, the airbag 10 can be inflated and deployed to a predetermined thickness and shape. Movements occurring after the airbag 10 is inflated and deployed can also be suppressed. Furthermore, because the inflation of the airbag 10 in the occupant direction is restricted, occupant safety can be improved. If the inner bag 30A alone is used as the tether belt without providing the connecting member 7, the size of the inner bag 30A needs to be increased to ensure the thickness of the airbag 10. However, by providing the connecting member 7, the airbag 10 can be inflated to a necessary thickness even with the small inner bag 30A.

The connecting member 7 is gradually drawn out while receiving resistance from the inner bag 30A. As a result, there is no sudden application of a large load to the connecting member 7, the outer bag 20, or the inner bag 30A. Because the loads to the joint portions become small, the strength of the joint portions may be relatively low. Therefore, limitations on the specifications of the components, the conditions of the components, the specifications of the joint portions, and the conditions of the joint portions are significantly eased. Various designs for the components and joint portions become possible. The stitching portions, the reaction plate 5, or the cushion ring 4 may be simplified. Accordingly, it is possible to reduce the efforts required to manufacture the airbag 10 and to improve the productivity. It is also possible to reduce the manufacturing costs of the airbag 10. The connecting member 7 receives resistance from the tubular inflation portions 38 when drawing the tubular inflation portions 38 into the inner bag 30A. Hence, the movement of the front surface of the outer bag 20 can be reliably and securely restricted by the connecting member 7.

As has been described above, the airbag device 1A can inflate and deploy the airbag 10 in a stable manner while preventing the airbag 10 from bursting out toward the occupant. Furthermore, it is possible to safely restrain and protect the occupant with the airbag 10. By using the airbag device 1A, it is possible to protect the occupant in various states, corresponding to differences in states of the occupant seated in the driver's seat.

FIG. 6 includes side views illustrating the airbag device 1A protecting an occupant. FIG. 6 illustrates two occupants 91 (91A and 91B) having different body sizes.

When the large occupant 91A (see FIG. 6A) is seated in a driver's seat 92, the occupant 91A situates the driver's seat 92 on the rear side in the vehicle. The distance, L1, between the occupant 91A and the airbag device 1A is large. When the small occupant 91B (see FIG. 6B) is seated in the driver's seat 92, the occupant 91B situates the driver's seat 92 on the front side in the vehicle. The distance, L2, between the occupant 91B and the airbag device 1A is small. Therefore, the small occupant 91B comes into contact with the airbag 10 in a shorter time than the large occupant 91A.

As has been described above, dangerous bursting out of the airbag 10 (indicated with dashed lines in FIGS. 6C and 6D) is prevented. The airbag 10 gradually inflates in the occupant direction while maintaining the front surface thereof flat. Therefore, the airbag 10 appropriately receives and protects the occupant 91A or 91B, without damaging the occupant 91A or 91B by bursting out. At this time, the large occupant 91A (see FIG. 6C) comes into contact with and is protected by the properly inflated and deployed airbag 10.

The small occupant 91B (see FIG. 6D) comes into contact with the airbag 10 that is in the middle of inflation and deployment. The occupant 91B comes into contact with the sufficiently inflated, flat airbag 10. Therefore, the occupant 91B is more safely protected by the airbag 10. In this manner, because the necessary absorbing stroke of the airbag 10 can be ensured regardless of the state of the occupant 91, it is possible to protect the occupant 91 without damage. Because this airbag 10 has high ability to restrain the occupant 91, and in particular, high initial restraint performance, it is possible to safely restrain the occupant 91 in various states.

Because the inflation of the outer bag 20 in the occupant direction is restricted by the connecting member 7, the outer bag 20 inflates preferentially sideways. Therefore, even when the occupant 91 is away from the driver's seat 92 and is near the airbag 10, damage to the occupant 91 due to bursting out of the airbag 10 can be suppressed. When the occupant 91 is in tight contact with the steering wheel 90, a small space is created between the occupant 91 and the steering wheel 90 by the inflation of the inner bag 30A. The outer bag 20 inflates sideways from this space. The airbag 10 deploys between the occupant 91 and the steering wheel 90. The occupant 91 is protected by the airbag 10.

The outer bag 20 quickly inflates sideways and deploys over a wide area in a short time. Therefore, even when the occupant 91 advances into the airbag 10 at high speed, the occupant 91 can be reliably received by the airbag 10. When the occupant 91 advances into the airbag 10 that is in the middle of deployment, the occupant 91 is received by the inner bag 30A having high internal pressure. The inner bag 30A absorbs the impact and energy of the occupant 91. Furthermore, the inner bag 30A prevents the occupant 91 from touching the steering wheel 90.

The thickness of the airbag 10 at an early stage of deployment is determined by the height of the inflated inner bag 30A. For example, by reducing the thickness of the airbag 10 at an early stage of deployment according to the distance between the occupant 91 and the airbag device 1A, the risk to the occupant 91 can be reduced. Then, due to the connecting member 7 being drawn out of the inner bag 30A, the outer bag 20 fully inflates to a large thickness. Thus, the airbag 10 obtains the maximum absorbing stroke. The airbag 10 safely receives the occupant 91. The airbag 10 gradually inflates and deploys through stages: the inner bag 30A inflates, the outer bag 20 inflates sideways, and the outer bag 20 fully inflates. Because the volume of the airbag 10 increases while maintaining sufficient internal pressure during the above-described process, the airbag 10 exhibits high occupant restraint performance.

The deployment performance of the airbag 10 can be finely controlled by changing the size of the inflated inner bag 30A, the length of the connecting member 7, or the connecting position of the connecting member 7. Because these changes can be made relatively easily, the deployment performance and deployment manner of the airbag 10 can be easily controlled.

Note that one tubular inflation portion 38 may be provided to the inner bag 30A so as to project in a predetermined direction (for example, downward or upward) from the inner bag 30A. Alternatively, three or more tubular inflation portions 38 may be provided to the inner bag 30A so as to radially project from the inner bag 30A. In other words, one or three or more tubular inflation portions 38 may be provided to the inner bag 30A. Furthermore, the inner bag 30A may be formed in any shape (e.g., a ball shape, an ellipsoidal shape, or a pyramid shape).

The connecting member 7 may be formed in a shape other than a belt shape, such as a string shape or a ribbon shape. The connecting member 7 may be connected to somewhere in the tubular inflation portions 38, other than the ends 38A. The connecting member 7 may be connected to somewhere in the inner bag 30A, other than the tubular inflation portions 38. The connecting member 7 may be connected to one or three or more portions in the inner bag 30A. The connecting member 7 may be connected to the outer bag 20 through an opening provided in the inner bag 30A, other than the flow port 31. However, by connecting the connecting member 7 to the outer bag 20 through the flow port 31, effort and man-hours to provide another opening can be reduced.

Second Embodiment

Figure 8:
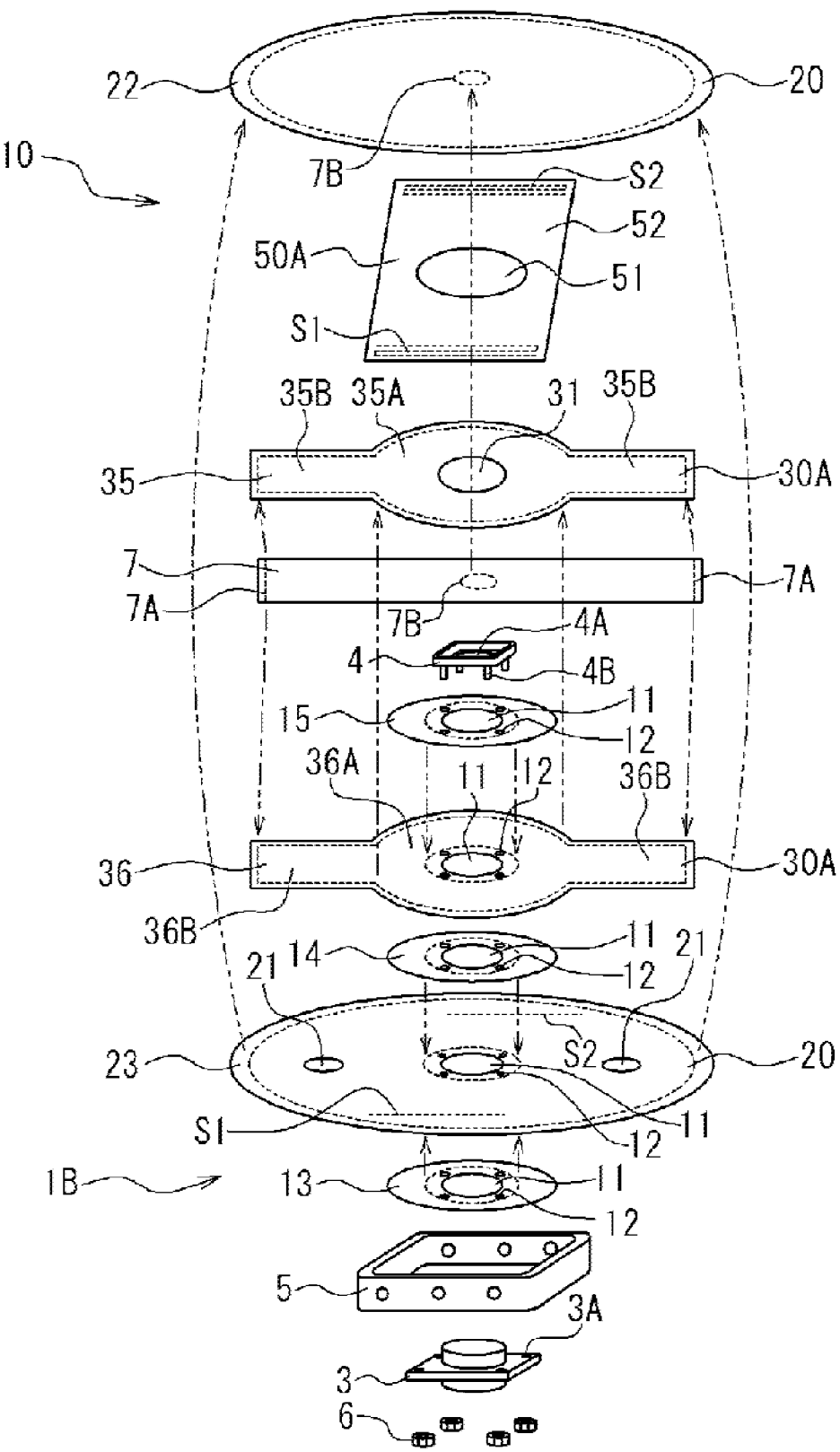
FIG. 8 is an exploded perspective view of the airbag device in FIG. 7.

FIG. 7 illustrates an airbag device 1 according to a second embodiment (hereinbelow, an "airbag device 1B"). FIG. 7 schematically illustrates the airbag device 1B as viewed from the arrow X direction in FIG. 1. Furthermore, FIG. 7 illustrates the airbag 10 at an early stage of deployment in cross-section. FIG. 8 is an exploded perspective view of the airbag device 1B in FIG. 7. FIG. 8 illustrates components of the airbag device 1B spaced apart in the up-down direction. FIG. 8 also shows, with arrows, the relationship between components to be combined and the positions where the components are to be combined. FIGS. 7 and 8 correspond to FIGS. 2 and 3, respectively, which are described in the first embodiment.

As illustrated in the figures, in this airbag device 1B, the airbag 10 has a restraint member 50 (hereinbelow, the restraint member according to this embodiment will be denoted by 50A). The airbag device 1B has the same configuration as the airbag device 1A according to the first embodiment, except for the restraint member 50A. Herein, the same components as the airbag device 1A described above will be called by the same names and denoted by the same reference numerals, and the descriptions thereof will be omitted. The restraint member 50A will be described in detail below.

When the inner bag 30A inflates, the restraint member 50A inside the outer bag 20 restrains inflation of the inner bag 30A in the occupant direction. Herein, the restraint member 50A is composed of a belt-shaped member 52 having an opening 51 at the center. The restraint member 50A is connected to the rear surface of the outer bag 20 (rear base fabric piece 23). The belt-shaped member 52 is a rectangular base fabric piece (belt-shaped fabric piece). Before the airbag 10 is inflated, the belt-shaped member 52 is disposed between the front surface of the inner bag 30A (front base fabric piece 35) and the front surface of the outer bag 20 (front base fabric piece 22). The belt-shaped member 52 is stitched to the rear base fabric piece 23 of the outer bag 20, at positions outward of the edge of the inner bag 30A. Thus, the ends of the belt-shaped member 52 are joined to the rear surface of the outer bag 20. The inner bag 30A is disposed between the restraint member 50A and the rear surface of the outer bag 20.

The opening 51 in the restraint member 50A is a circular hole. The opening 51 has a predetermined diameter that is smaller than the inflated and deployed inner bag 30A. The opening 51 is a passing hole through which the inner bag 30A can pass. Before the airbag 10 is inflated, the opening 51 is arranged so as to be concentric with the ball-shaped inflation portion 37 of the inner bag 30A. That is, the opening 51 is arranged between the front surface of the inner bag 30A and the front surface of the outer bag 20 such that the inner bag 30A can pass therethrough.

Before the airbag 10 is inflated, the inner bag 30 is disposed so as to cross the restraint member 50A. The ball-shaped inflation portion 37 of the inner bag 30A is covered by the restraint member 50A. The tubular inflation portions 38 are disposed so as to extend outward of the restraint member 50A through side openings in the restraint member 50A. The flow port 31 in the inner bag 30A is disposed within the opening 51 in the restraint member 50A. The connecting member 7 is connected to the front surface of the outer bag 20 through the opening 51.

When the airbag 10 is inflated, the restraint member 50A restrains the front surface of the inflating inner bag 30A (ball-shaped inflation portion 37) to restrict the inflation of the inner bag 30A in the occupant direction. The ball-shaped inflation portion 37 inflates and deploys between the restraint member 50A and the rear surface of the outer bag 20. At this time, the ball-shaped inflation portion 37 inflates and deploys to a larger size than the opening 51. Hence, the ball-shaped inflation portion 37 cannot pass through the opening 51 and is held between the restraint member 50A and the outer bag 20.

When the inflated and deployed inner bag 30A gradually contracts, the opening 51 allows the contracting inner bag 30A to pass therethrough in the occupant direction. While passing through the opening 51, the inner bag 30A gradually deforms such that it is stretched in the occupant direction. The opening 51 also allows the connecting member 7, which is drawn out of the inner bag 30A, to pass therethrough in the occupant direction. The tubular inflation portions 38 are drawn into the inner bag 30A and pass through the opening 51. In this manner, the inner bag 30A is restrained by the restraint member 50A. The restraint member 50A restricts inflation and deployment of the inner bag 30A in the occupant direction. As the connecting member 7 and the inner bag 30A pass through the opening 51, the front surface of the outer bag 20 moves in the occupant direction.

Next, a manufacturing process of the airbag device 1B (see FIG. 8) will be described.

The outer bag 20 and the inner bag 30A are formed by the same process as the first embodiment. However, before the base fabric pieces 22 and 23 constituting the outer bag 20 are stitched together (in FIG. 8, dashed lines indicate the stitching portions), ends of the restraint member 50A are stitched to the rear base fabric piece 23 (joint portions S1 and S2). Next, the inner bag 30A is inserted into the outer bag 20. The inner bag 30A is arranged between the rear base fabric piece 23 of the outer bag 20 and the restraint member 50A. Furthermore, the two tubular inflation portions 38 are disposed on the outside of the restraint member 50A. The connecting member 7 is stitched to the front base fabric piece 22 of the outer bag 20, at a position within the attachment opening 11, the flow port 31, and the opening 51. Then, the airbag device 1B is formed in the same way as the first embodiment. The airbag device 1B inflates and deploys the airbag 10 with the gas generated by the inflator 3.

Figure 9:
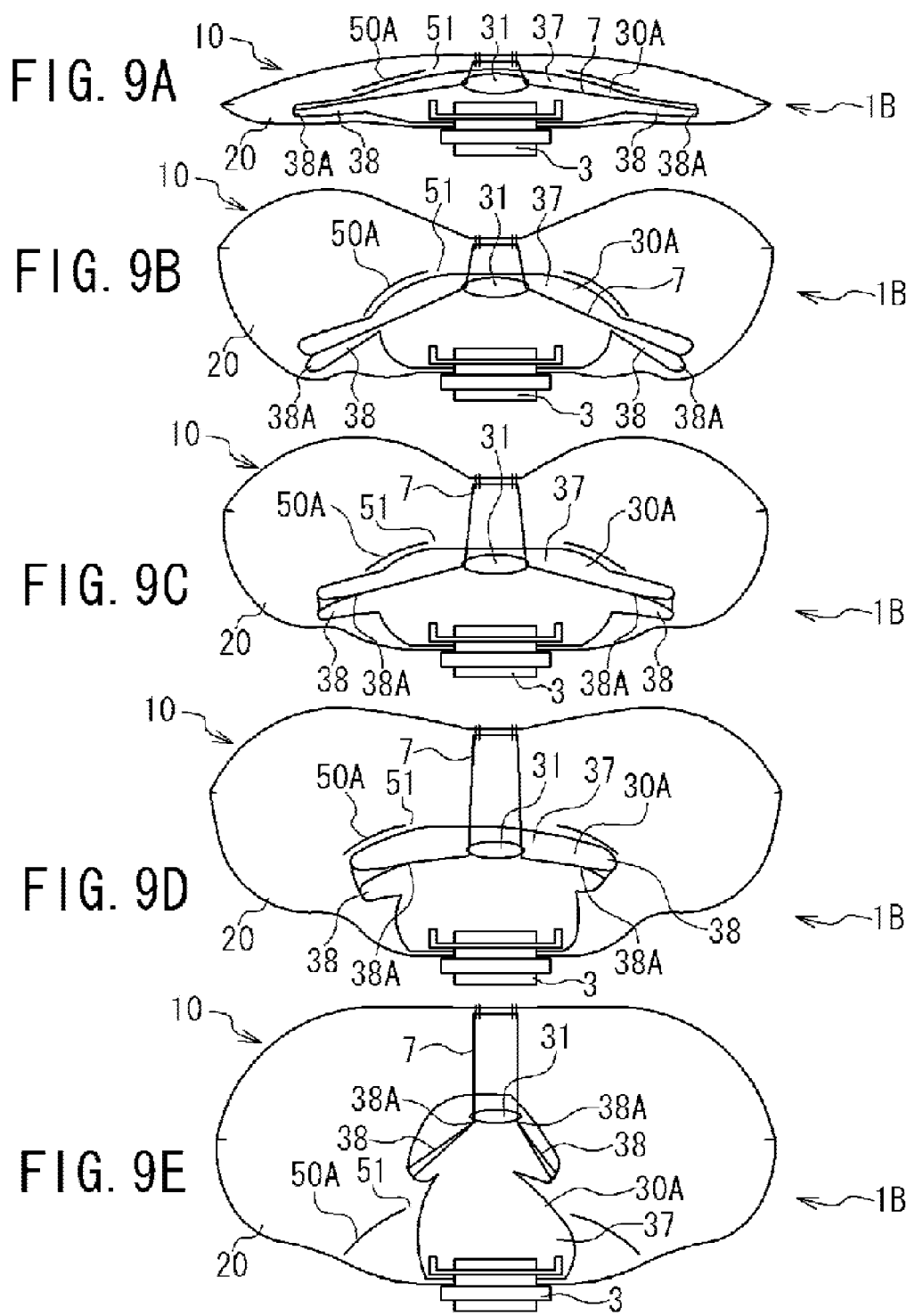
FIG. 9 includes cross-sectional views illustrating, in sequence, stages of inflation and deployment of the airbag.

FIG. 9 includes cross-sectional views illustrating, in sequence, stages of inflation and deployment of the airbag 10.

Note that the airbag 10 inflates and deploys through basically the same process as the first embodiment. Hence, herein, inflation and deployment of the airbag 10 will be described, focusing on a process different from the already described process.

At an early stage of deployment of the airbag 10, first, the inner bag 30A inflates between the restraint member 50A and the rear surface of the outer bag 20 (see FIG. 9A). The ball-shaped inflation portion 37 is restrained by the restraint member 50A. Inflation of the ball-shaped inflation portion 37 in the occupant direction is restricted. The front surface of the inner bag 30A is pressed against the restraint member 50A. Movement of the front surface of the inner bag 30A in the occupant direction is inhibited. The tubular inflation portions 38 inflate from portions near the ball-shaped inflation portion 37 to the ends 38A. The front surface of the outer bag 20 is pulled by the connecting member 7. Movement of the front surface of the outer bag 20 in the occupant direction is inhibited.

The outer bag 20 starts to inflate with the gas supplied through the flow port 31 in the inner bag 30A. The outer bag 20 inflates in the occupant direction as the internal pressure increases (see FIG. 9B). The connecting member 7 is pulled by the inflating outer bag 20. The connecting member 7 is drawn out of the inner bag 30A, which is restrained by the restraint member 50A, through the flow port 31 and the opening 51 (see FIG. 9C). The front surface of the outer bag 20 moves in the occupant direction by an amount corresponding to the amount by which the connecting member 7 is drawn out (see FIG. 9D). As the gas flows out of the flow port 31, the ball-shaped inflation portion 37 gradually contracts while being pressed against the opening 51 in the restraint member 50A. The tubular inflation portions 38 are drawn into the inner bag 30A by the connecting member 7 and are reversed.

The connecting member 7 is drawn out of the inner bag 30A while contracting the tubular inflation portions 38 and the inner bag 30A. As a result of the contraction, the inner bag 30A becomes about the size of the opening 51 in the restraint member 50A. Eventually, the inner bag 30A becomes smaller than the opening 51 (see FIG. 9E). While this happens, the inner bag 30A is pulled by the connecting member 7. As a result, the inner bag 30A passes through the opening 51 in the occupant direction while receiving resistance from the opening 51. That is, due to the connecting member 7 being drawn out, the inner bag 30A contracts and passes through the opening 51 and gradually deforms in the occupant direction. The opening 51 moves relative to the inner bag 30A along the outer circumference of the contracting inner bag 30A. Furthermore, the opening 51 squeezes the inner bag 30A passing through the opening 51 and applies resistance to the inner bag 30A.

Subsequently, the inner bag 30A passes through the opening 51. The inner bag 30A is released from the restraint member 50A. After the inner bag 30A has passed through the opening 51, the outer bag 20 fully inflates and deploys in front of the occupant, in the same way as above. The airbag device 1B receives the occupant 91 with the inflated and deployed airbag 10.

This airbag device 1B provides the same advantages as the airbag device 1A according to the first embodiment. Furthermore, by controlling the inflation of the inner bag 30A in the occupant direction with the restraint member 50A, movement of the front surface of the outer bag 20 can be more reliably restricted. The inner bag 30A inflates and deploys between the restraint member 50A and the rear surface of the outer bag 20. Therefore, the shape of the inflated inner bag 30A can be controlled by the restraint member 50A and the outer bag 20. Note that the restraint member 50A may be formed in a shape other than a rectangular shape (e.g., a circular shape or a triangular shape).

Third Embodiment

Figure 10:
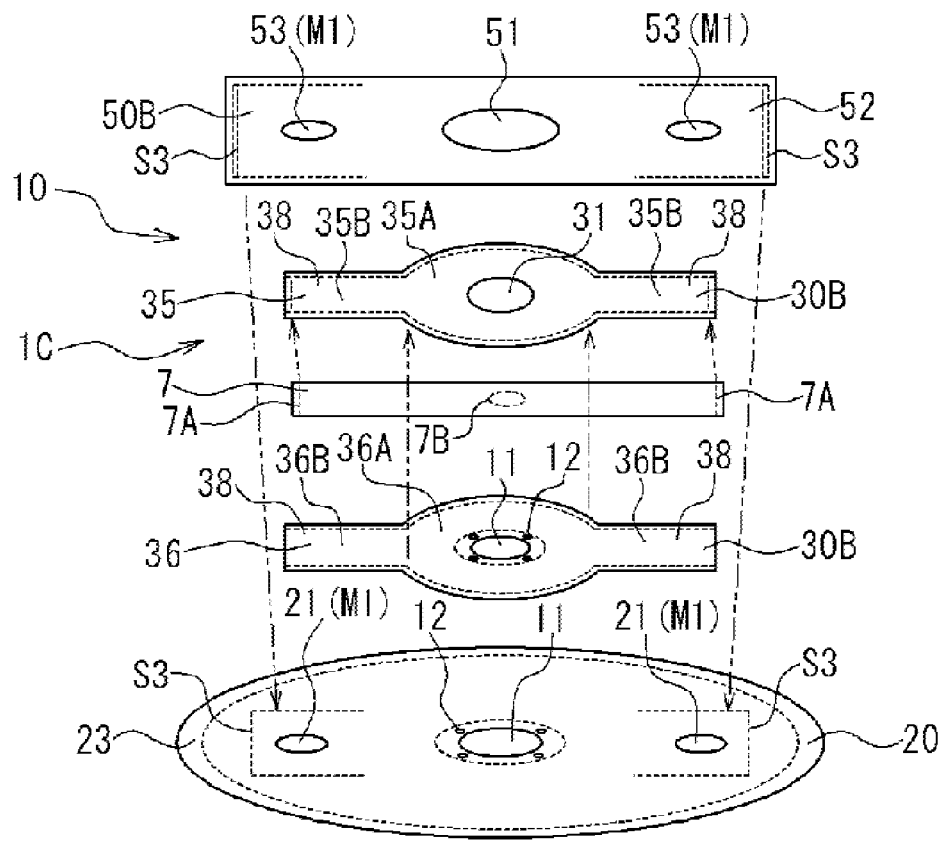
FIG. 10 illustrates an airbag device according to a third embodiment.

FIG. 10 illustrates an airbag device 1 according to a third embodiment (hereinbelow, an "airbag device 1C"). In FIG. 10, a portion of the airbag device 1C is illustrated in perspective view, corresponding to FIG. 8.

In this airbag device 1C, a part of the restraint member 50 and the inner bag 30 (hereinbelow, the restraint member and the inner bag according to this embodiment will be denoted by 50B and 30B, respectively) differs from the restraint member 50A and the inner bag 30A according to the second embodiment. Furthermore, the connecting member 7 and the rear base fabric piece 23 of the outer bag 20 are partially different. Other than these differences, the airbag device 1C has the same configuration as the airbag device 1B according to the second embodiment. Herein, the same components as the airbag device 1B described above will be called by the same names and denoted by the same reference numerals, and the descriptions thereof will be omitted. The restraint member 50B and the inner bag 30B will be described in detail below. Note that FIG. 10 only illustrates components different from those in FIG. 8, and components common to those in FIG. 8 are omitted.

As illustrated in the figure, the restraint member 50B has through-holes 53 on both sides of the opening 51. The through-holes 53 are circular holes through which the gas passes. The through-holes 53 are formed to have the same area (first area M1) as the vent holes 21 in the outer bag 20. The distance between the two through-holes 53 is almost the same as that between the two vent holes 21. The restraint member 50B is stitched to the rear base fabric piece 23 of the outer bag 20 such that the through-holes 53 overlap the vent holes 21.

The restraint member 50B is disposed along the tubular inflation portions 38 of the inner bag 30B and covers the entire inner bag 30B. The two tubular inflation portions 38 are entirely disposed between the restraint member 50B and the rear surface of the outer bag 20 (rear base fabric piece 23). The restraint member 50B is joined to the peripheral portions of the vent holes 21. Joint portions S3 of the restraint member 50B are provided so as to surround the through-holes 53 and the ends 38A of the tubular inflation portions 38. The ends 38A of the tubular inflation portions 38 are disposed in the joint portions S3 of the restraint member 50B.

Figure 11:
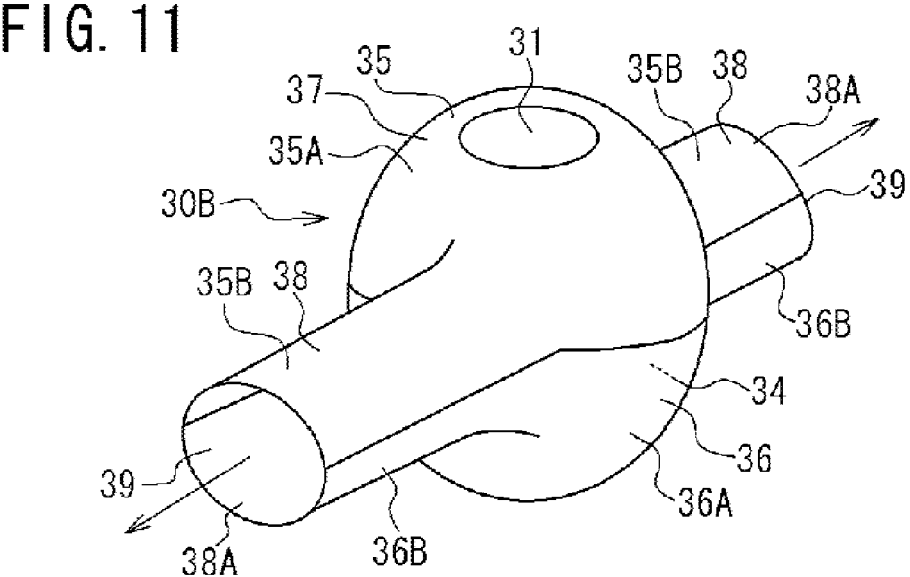
FIG. 11 includes perspective views of an inner bag according to the third embodiment.

FIG. 11 is a perspective view of the inflated inner bag 30B.

As illustrated in the figure, the inner bag 30B has discharge ports 39 at the ends 38A of the tubular inflation portions 38. The gas inside the inner bag 30B is discharged outside the inner bag 30B through the discharge ports 39. The discharge ports 39 are unjoined portions provided at the ends of the tubular inflation portions 38. The discharge ports 39 are formed by leaving the ends of the rectangular portions 35B and 36B unstitched. The gas is discharged sideways through the discharge ports 39 from the inner bag 30B. The inner bag 30B discharges the gas generated by the inflator 3 through the discharge ports 39. The gas is discharged through the tubular inflation portions 38.

Before the airbag 10 is inflated, the ends 38A of the tubular inflation portions 38 (see FIG. 10) are disposed on the vent holes 21 in the outer bag 20 or at positions near the vent holes 21. The discharge ports 39 are disposed so as to face the vent holes 21. As will be described below, the tubular inflation portions 38 inflate and contract between the restraint member 50B and the rear surface of the outer bag 20. When the tubular inflation portions 38 are drawn into the inner bag 30B by the connecting member 7, the tubular inflation portions 38 move away from the vent holes 21. When the tubular inflation portions 38 are reversed, the reversed portions of the base fabric pieces 35 and 36 are brought into tight contact with each other. As a result, the discharge ports 39 are closed within the inner bag 30B. The discharge of the gas through the discharge ports 39 is stopped.

Next, a manufacturing process of the airbag device 1C will be described.

The outer bag 20 is formed by the same process as the first embodiment. However, before the base fabric pieces 22 and 23 constituting the outer bag 20 are stitched together (in FIG. 10, dashed lines indicate the stitching portions), the restraint member 50B is stitched to the rear base fabric piece 23 (joint portions S3). Concerning the inner bag 30B, the connecting member 7 is overlapped on the inner surface of the front base fabric piece 35. The ends 7A of the connecting member 7 are stitched to the front base fabric piece 35. Next, the base fabric pieces 35 and 36 are stacked such that the outer surfaces thereof are face-to-face. The base fabric pieces 35 and 36 are stitched together along the edges thereof. Then, the base fabric pieces 35 and 36 are turned inside out through the attachment opening 11. Thus, the inner bag 30B is formed. Note that FIG. 10 illustrates the arrangement of the components after the inner bag 30B is turned inside out.

Next, the inner bag 30B is inserted into the outer bag 20. The inner bag 30B is arranged between the rear base fabric piece 23 of the outer bag 20 and the restraint member 50B. The ends 38A of the two tubular inflation portions 38 are disposed on the vent holes 21, within the joint portions S3 of the restraint member 50B. Then, the airbag device 1C is formed in the same way as the first embodiment. The airbag device 1C inflates and deploys the airbag 10 with the gas generated by the inflator 3.

FIG. 12 includes cross-sectional views illustrating, in sequence, stages of inflation and deployment of the airbag 10.

Note that the airbag 10 inflates and deploys through basically the same process as the second embodiment. Hence, herein, a process different from that according to the second embodiment will be mainly described.

Figure 12A:
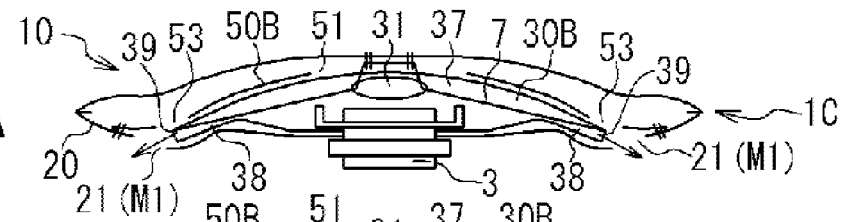
FIG. 12 includes cross-sectional views illustrating, in sequence, stages of inflation and deployment of the airbag.
Figure 12B:
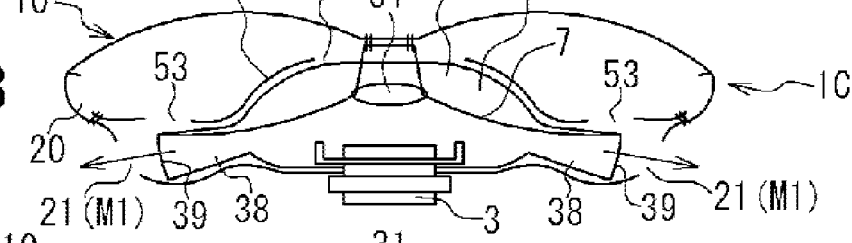
Figure 12C:
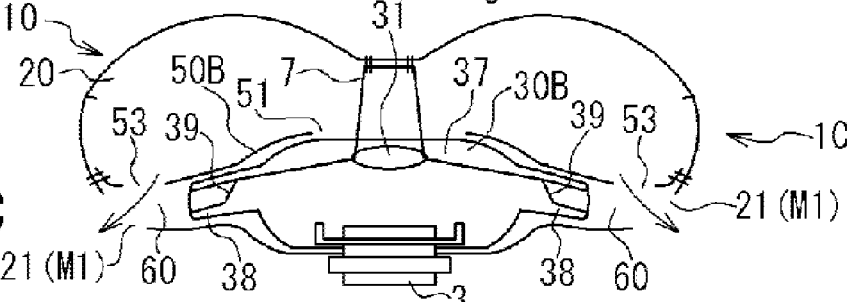
Figure 12D:
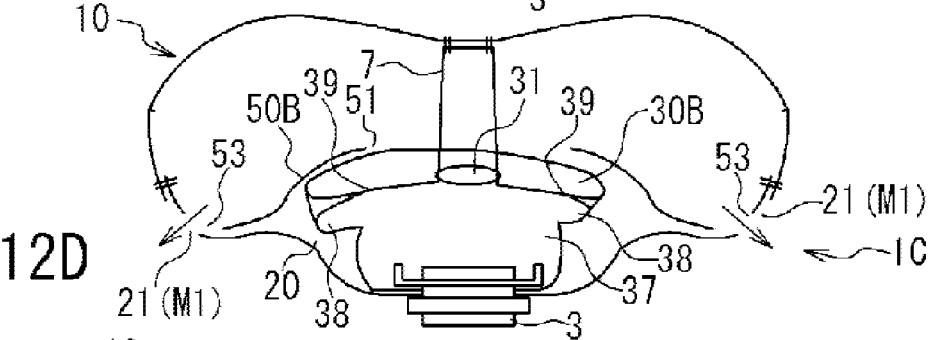

At an early stage of deployment of the airbag 10, first, the inner bag 30B inflates between the restraint member 50B and the rear surface of the outer bag 20 (see FIG. 12A). The tubular inflation portions 38 inflate to the ends 38A. The discharge ports 39 in the tubular inflation portions 38 are opened (see FIG. 12B). The inner bag 30B directly discharges the gas generated by the inflator 3 through the discharge ports 39. The discharged gas is discharged outside the outer bag 20 through the vent holes 21.

The outer bag 20 starts to inflate with the gas supplied through the flow port 31 in the inner bag 30B. The outer bag 20 inflates in the occupant direction as the internal pressure of the outer bag 20 increases. The connecting member 7 is drawn out of the inner bag 30B (see FIG. 12C). As a result, the front surface of the outer bag 20 moves in the occupant direction.

The tubular inflation portions 38 are drawn into the inner bag 30B and reversed by the connecting member 7. The discharge ports 39 are closed. Discharge of gas through the discharge ports 39 is stopped. At this time, the inflated tubular inflation portions 38 form spaces 60 between the restraint member 50B and the vent holes 21, through which the gas flows. The gas flows. between the spaces 60 and other spaces in the outer bag 20 through the through-holes 53 in the restraint member 50B. Thus, there is no pressure difference between the ends of the restraint member 50B. The gas inside the outer bag 20 is discharged outside through the through-holes 53 and the vent holes 21, which have the first area M1.

The connecting member 7 is drawn out of the inner bag 30B while contracting the tubular inflation portions 38 and the inner bag 30B. Meanwhile, the ends 38A of the tubular inflation portions 38 move away from the vent holes 21. The spaces 60 are narrowed (see FIG. 12D). Due to the tension caused by the inflation of the outer bag 20 and the internal pressure of the outer bag 20, a force directed to the rear surface of the outer bag 20 acts on the restraint member 50B. As a result, the restraint member 50B gradually approaches the vent holes 21. As the through-holes 53 in the restraint member 50B approach the vent holes 21, flow of gas through the vent holes 21 is inhibited. The gas becomes gradually less likely to be discharged from the vent holes 21. In other words, the pseudo-opening area of the vent holes 21 gradually decreases. As a result, the amount of gas discharged from the vent holes 21 continuously decreases as the outer bag 20 inflates.

Figure 12E:
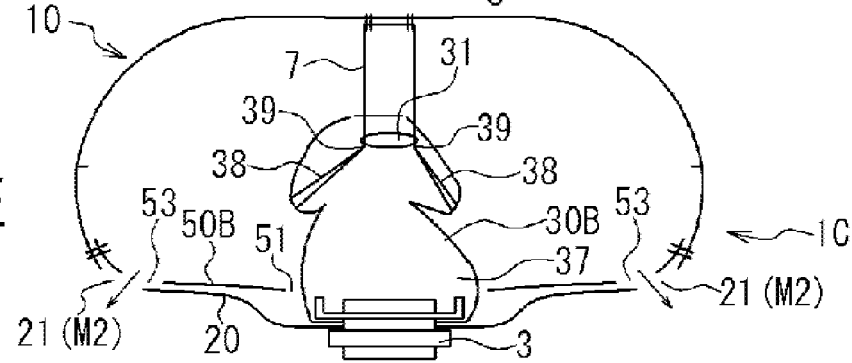

Subsequently, the inner bag 30B is pulled by the connecting member 7 and passes through the opening 51 toward the occupant (see FIG. 12E). The outer bag 20 fully inflates and deploys in front of the occupant 91. When the inner bag 30B has passed through the opening 51, the restraint member 50B comes into tight contact with the rear surface of the outer bag 20. At the same time, the through-holes 53 in the restraint member 50B overlap the vent holes 21. The through-holes 53 are provided at positions shifted from the vent holes 21. The through-holes 53 overlap the vent holes 21 in a shifted manner. Because the vent holes 21 are partially closed by the peripheral portions of the through-holes 53 in the restraint member 50B, the area of opening (opening area) of the vent holes 21 is changed by the restraint member 50B. Thus, the opening area of the vent holes 21 is changed to an area (second area M2) smaller than the first area M1. The amount of gas discharged from the vent holes 21 decreases. The airbag device 1C receives the occupant 91 with the airbag 10 at any stage of inflation.

This airbag device 1C provides the same advantages as the airbag devices 1A and 1B according to the first and second embodiments. Because the discharge ports 39 are provided at the ends 38A of the tubular inflation portions 38, the occupant 91 in any state can be safely protected. For example, when the occupant 91 approaches or comes into contact with the airbag device 1C, the occupant 91 comes into contact with the airbag 10 in a short time (see FIG. 12B). As in this case, when the occupant 91 is in an OOP (out of position) state, the occupant 91C in an abnormal riding position comes into contact with the airbag 10. In such a case, because the gas generated by the inflator 3 is directly discharged outside the outer bag 20 through the vent holes 21 and the discharge ports 39, inflation of the airbag 10 toward the occupant is suppressed. As a result of this, the energy supplied to the airbag 10 is reduced, so the risk of damaging the occupant 91 with the airbag 10 significantly decreases.

In particular, because the gas generated by the inflator 3 has higher initial velocity than the gas discharged through the vent holes 21, the gas is efficiently discharged from the discharge ports 39. Therefore, a large amount of gas can be discharged from the discharge ports 39 in a short time. Furthermore, even if the size of the discharge ports 39 is reduced, a sufficient amount of gas can be discharged. Accordingly, with this airbag device 1C, damage to the occupant 91 in an OOP state can be suppressed. When the occupant 91 is small, the occupant 91 is received by the airbag 10 inflated to a certain size. By discharging the gas from the discharge ports 39 in the airbag 10 as necessary, the impact to the occupant 91 can be reduced.

When the occupant 91 advances into the airbag 10 while the tubular inflation portions 38 are drawn into the inner bag 30B (see FIG. 12C), the connecting member 7 is returned to the inner bag 30B. As a result, the tubular inflation portions 38 are returned to the outside of the inner bag 30B due to the gas pressure. The closed discharge ports 39 are opened. By discharging the gas through the reopened discharge ports 39, the airbag 10 absorbs the impact and energy of the occupant 91. When the occupant 91 is not in an OOP state (see FIGS. 12D and 12E), the occupant 91 is protected by the fully inflated and deployed airbag 10. As has been described, by using the airbag device 1C, it is possible to cope with various states of the occupant 91. In this case, there is no need to use a sensor for sensing the state of the occupant 91 or a special inflator for controlling deployment of the airbag 10.

The opening area of the vent holes 21 can be changed with the through-holes 53 in the restraint member 50B. Furthermore, it is possible to change the amount of gas discharged from the vent holes 21. It is also possible to gradually change the amount of gas discharged from the vent holes 21. Accordingly, an appropriate amount of gas can be discharged at any stage of inflation of the airbag 10. The airbag 10 exhibits appropriate impact absorbing properties. By changing the amount of shift in position between the through-holes 53 and the vent holes 21, the opening area of the vent holes 21 and the amount of gas to be discharged can be adjusted. The amount of gas to be discharged outside the airbag 10 can be changed according to the time before the occupant 91 comes into contact with the airbag 10 and according to the amount by which the occupant 91 advances into the airbag 10. In addition, the airbag device 1C can protect the occupants 91 of any body size according to the difference in body size among occupants 91.

Figure 13A:
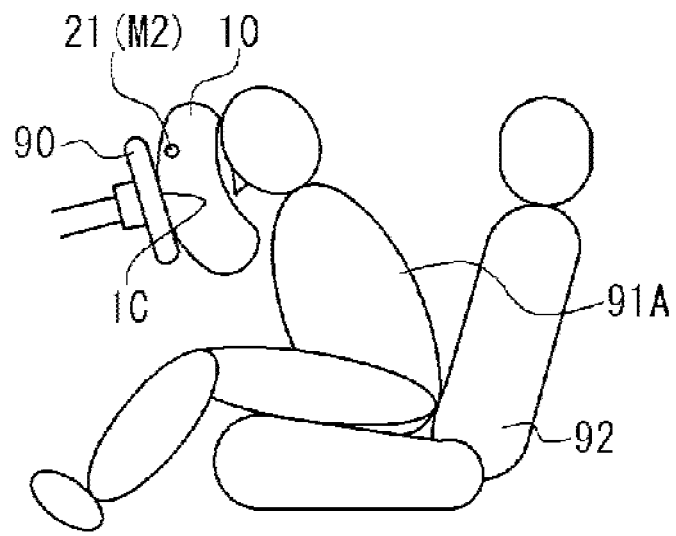
FIG. 13 includes side views illustrating the airbag device protecting an occupant.
Figure 13B:
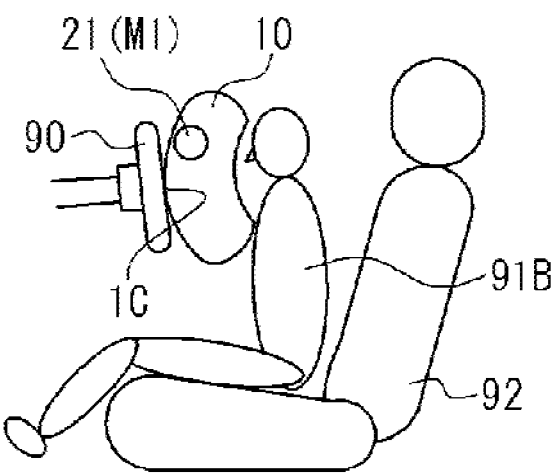

FIG. 13 includes side views illustrating the airbag device 1C protecting the occupant 91. FIG. 13 illustrates a large, heavy occupant 91A and a small, light occupant 91B.

The large occupant 91A (see FIG. 13A) is seated in the driver's seat 92 with a large distance from the airbag device 1C. Therefore, the timing at which the occupant 91A comes into contact with the airbag 10 is delayed. When the occupant 91A comes into contact with the airbag 10, the airbag 10 is supposed to absorb large energy. Hence, small vent holes 21 are preferred. Thus, the opening area of the vent holes 21 becomes small, i.e., the second area M2, at the final stage of deployment of the airbag 10, at which the occupant 91A comes into contact with the airbag 10. In this state, the airbag 10 receives the occupant 91A.

The small occupant 91B (see FIG. 13B) is seated in the driver's seat 92 with a small distance from the airbag device 1C. Therefore, the occupant 91B comes into contact with the airbag 10 in a short time. When the occupant 91B comes into contact with the airbag 10, the airbag 10 is supposed to absorb small energy. Hence, large vent holes 21 are preferred. Thus, the opening area of the vent holes 21 becomes large, i.e., the first area M1, at an early stage of deployment of the airbag 10, at which the occupant 91B comes into contact with the airbag 10. In this state, the airbag 10 receives the occupant 91B.

As has been described, depending on the body size of the occupant 91, the timing at which the occupant 91 comes into contact with the airbag 10 varies. By changing the opening area of the vent holes 21 according to the timing at which the occupant 91 comes into contact with the airbag 10, the airbag 10 exhibits appropriate impact absorbing properties. The airbag 10 receives the occupant 91 with the optimum conditions for the body size of the occupant 91. The impact of the occupant 91 is absorbed by the airbag 10. Because it is possible to cope with the occupant 91 of any body size by using the airbag device 1C, safety of the occupant 91 can be increased. In this case, there is no need to use a sensor or a special inflator. Note that the through-holes 53 having smaller areas than the vent holes 21 may be formed in the restraint member 50B. By overlapping such through-holes 53 on the vent holes 21, the opening area of the vent holes 21 can be changed.

Fourth Embodiment

Figure 14:
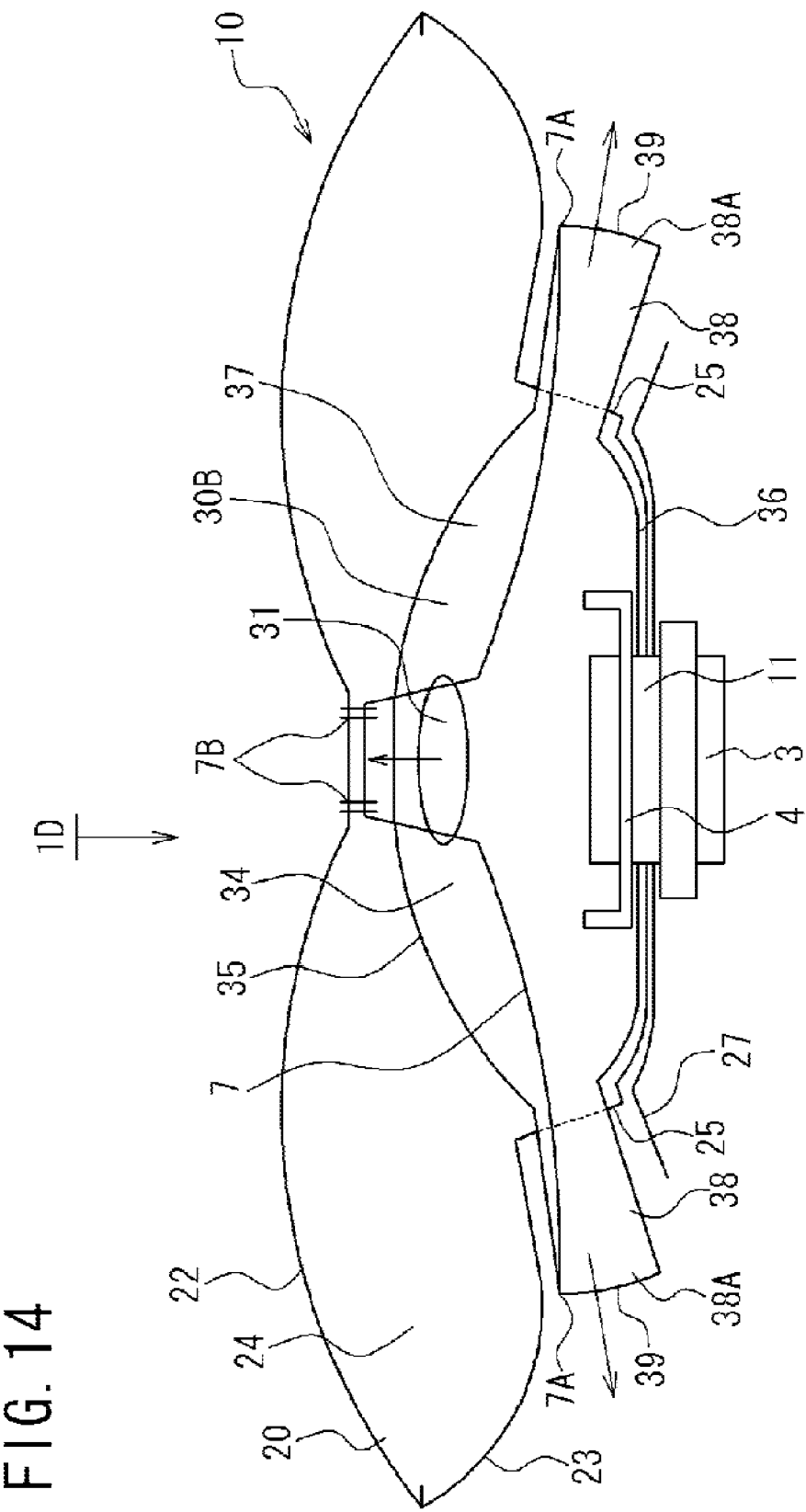
FIG. 14 illustrates an airbag device according to a fourth embodiment.
Figure 15:
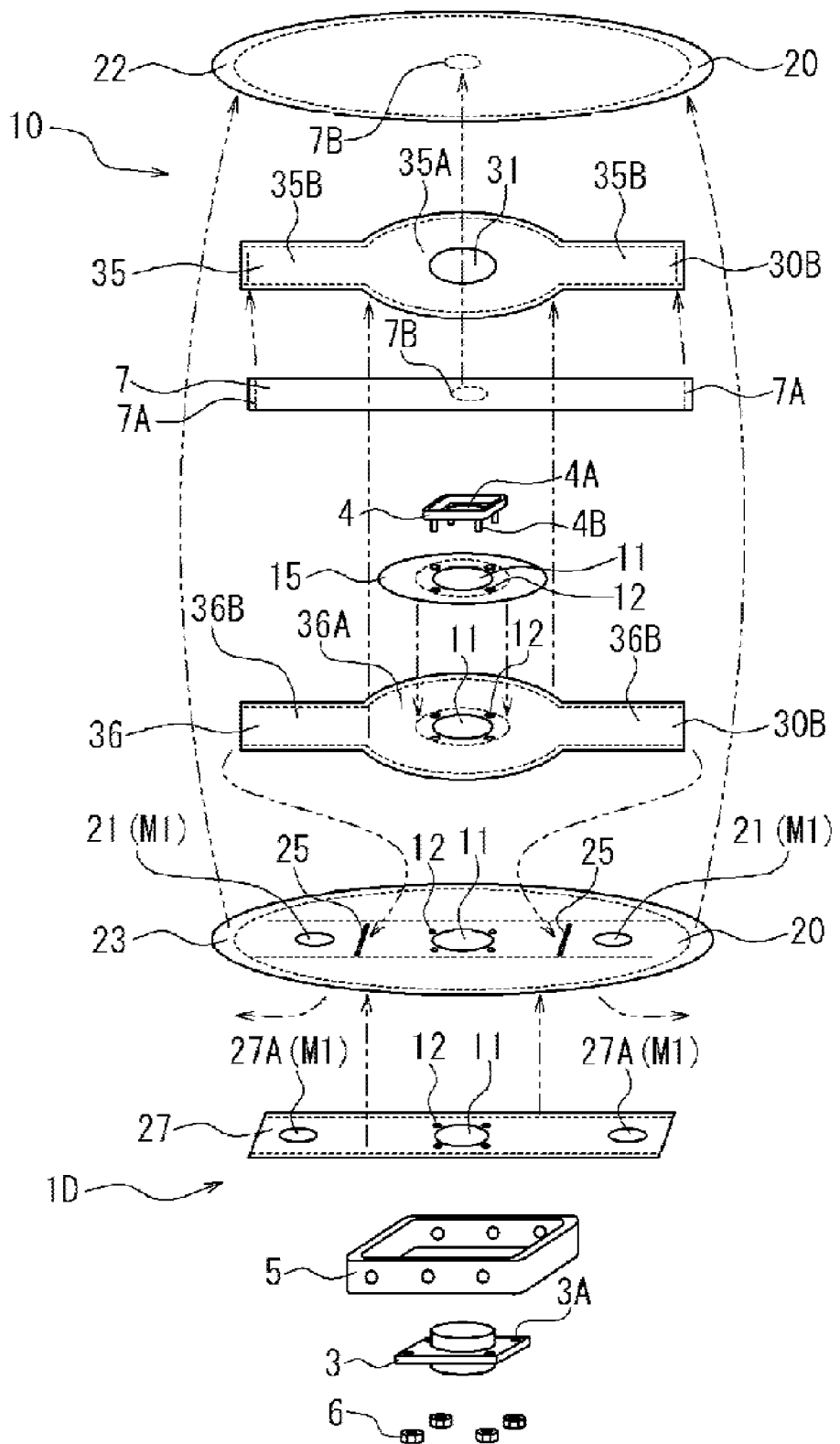
FIG. 15 is an exploded perspective view of the airbag device in FIG. 14.

FIG. 14 illustrates an airbag device 1 according to a fourth embodiment (hereinbelow, an "airbag device 1D"). FIG. 14 schematically illustrates the airbag device 1D as viewed from the arrow X direction in FIG. 1. Furthermore, FIG. 14 illustrates the airbag 10 at an early stage of deployment in cross-section. FIG. 15 is an exploded perspective view of the airbag device 1D in FIG. 14. FIG. 15 illustrates components of the airbag device 1D spaced apart in the up-down direction. FIG. 15 also shows, with arrows, the relationship between components to be combined and the positions where the components are to be combined. FIGS. 14 and 15 respectively correspond to FIGS. 2 and 3 described in the first embodiment.

This airbag device 1D differs from the airbag device 1A according to the first embodiment in the way of arranging the inner bag 30B. Furthermore, the configuration of the airbag 10 is partially changed. Herein, the same components as the airbag device 1A described above will be called by the same names and denoted by the same reference numerals, and the descriptions thereof will be omitted. The difference regarding the inner bag 30B and the airbag 10 will be described in detail below.

As illustrated in the figures, the airbag 10 includes the inner bag 30B, which has the discharge ports 39. The restraint member 50 is not provided in the outer bag 20. The outer bag 20 has a reinforcing cover 27. The reinforcing cover 27 is a reinforcing fabric piece for reinforcing the rear base fabric piece 23 of the outer bag 20. The reinforcing cover 27 protects the rear base fabric piece 23 from gas and heat generated by the inflator 3. The rear base fabric piece 23 is not provided with the above-described reinforcing fabric pieces 13 and 14. The rear base fabric piece 23 is reinforced by the reinforcing cover 27. The reinforcing cover 27 also serves as a vent hole cover (outside cover) provided on the outside of the outer bag 20. The reinforcing cover 27 is disposed on the vent holes 21. The reinforcing cover 27 is disposed outside the outer bag 20 so as to cover the vent holes 21. Side edges of the reinforcing cover 27 are joined to the outer surface of the rear base fabric piece 23.

The reinforcing cover 27 is formed of a rectangular base fabric piece. The reinforcing cover 27 is shorter than the base fabric pieces 35 and 36 constituting the inner bag 30B. Furthermore, the reinforcing cover 27 has the attachment opening 11 and two through-holes 27A. The attachment opening 11 is provided at the center of the reinforcing cover 27. The through-holes 27A allow gas to pass therethrough. The through-holes 27A have the same configuration as the above-described through-holes 53 in the restraint member 50B. More specifically, the through-holes 27A are circular holes and have, like the vent holes 21, the first area M1. The two through-holes 27A are provided on both sides of the attachment opening 11. The two through-holes 27A are arranged at the same distance as that between the two vent holes 21. The reinforcing cover 27 is stitched to the rear base fabric piece 23 of the outer bag 20 such that the through-holes 27A overlap the vent holes 21. At this time, the through-holes 27A are provided at positions aligned with the vent holes 21. When the reinforcing cover 27 comes into tight contact with the rear surface of the outer bag 20, the through-holes 27A overlap the vent holes 21.

Before the airbag 10 is inflated, the ends 38A of the tubular inflation portions 38 are made to pass through passing holes 25 provided in the outer bag 20. The ends 38A are disposed outside the outer bag 20 through the passing holes 25. The passing holes 25 are slits provided in the rear base fabric piece 23 of the outer bag 20. The passing holes 25 are located near the vent holes 21. Furthermore, the passing holes 25 are formed at positions covered by the reinforcing cover 27 on the rear base fabric piece 23. The passing holes 25 are provided in the rear base fabric piece 23, on the attachment opening 11 side of the two vent holes 21.

The tubular inflation portions 38 are made to pass through the passing holes 25 from the inside of the outer bag 20 and are disposed outside the outer bag 20. The tubular inflation portions 38 are disposed outside the outer bag 20, between the reinforcing cover 27 and the outer surface of the outer bag 20. The ends 38A of the tubular inflation portions 38 are inserted into the reinforcing cover 27 (between the reinforcing cover 27 and the outer bag 20). The ends 38A are disposed outside the reinforcing cover 27 through the ends of the reinforcing cover 27. Note that the ends 38A of the tubular inflation portions 38 may be disposed outside the outer bag 20, between the reinforcing cover 27 and the outer bag 20. In such a case, the discharge ports 39 at the ends 38A are disposed on the vent holes 21 and the through-holes 27A or at positions near the vent holes 21 and the through-holes 27A.

Before the airbag 10 is inflated, the tubular inflation portions 38 are disposed in the reinforcing cover 27. Due to the inflation and contraction of the inner bag 30B, the tubular inflation portions 38 inflate and contract in the reinforcing cover 27. The tubular inflation portions 38 inflate within the reinforcing cover 27, forming spaces between the through-holes 27A and the vent holes 21. When the tubular inflation portions 38 are drawn into the inner bag 30B by the connecting member 7, the tubular inflation portions 38 are pulled by the connecting member 7. The tubular inflation portions 38 move into the outer bag 20. Furthermore, the tubular inflation portions 38 are drawn into the outer bag 20 through the passing holes 25. Due to the connecting member 7 being drawn out of the inner bag 30B, the ends 38A of the tubular inflation portions 38 are drawn into the outer bag 20. As a result, the tubular inflation portions 38 move out of the reinforcing cover 27. The reinforcing cover 27 comes into tight contact with the rear surface of the outer bag 20 and overlies the vent holes 21. At this time, the through-holes 27A overlap the vent holes 21. The passing holes 25 are closed by the reinforcing cover 27.

Next, a manufacturing process of the airbag device 1D (see FIG. 15) will be described.

The outer bag 20 is formed by the same process as the first embodiment. However, before the base fabric pieces 22 and 23 constituting the outer bag 20 are stitched together (in FIG. 15, dashed lines indicate stitching portions), the reinforcing cover 27 is stitched to the rear base fabric piece 23. The inner bag 30B is formed by the same process as the third embodiment. Next, the inner bag 30B is inserted into the outer bag 20. The connecting member 7 is stitched to the front base fabric piece 22 of the outer bag 20. The two ends 38A of the tubular inflation portions 38 are inserted into the reinforcing cover 27 through the passing holes 25. Then, the airbag device 1D is formed in the same way as the first embodiment. The airbag device 1D inflates and deploys the airbag 10 with the gas generated by the inflator 3.

Figure 16:
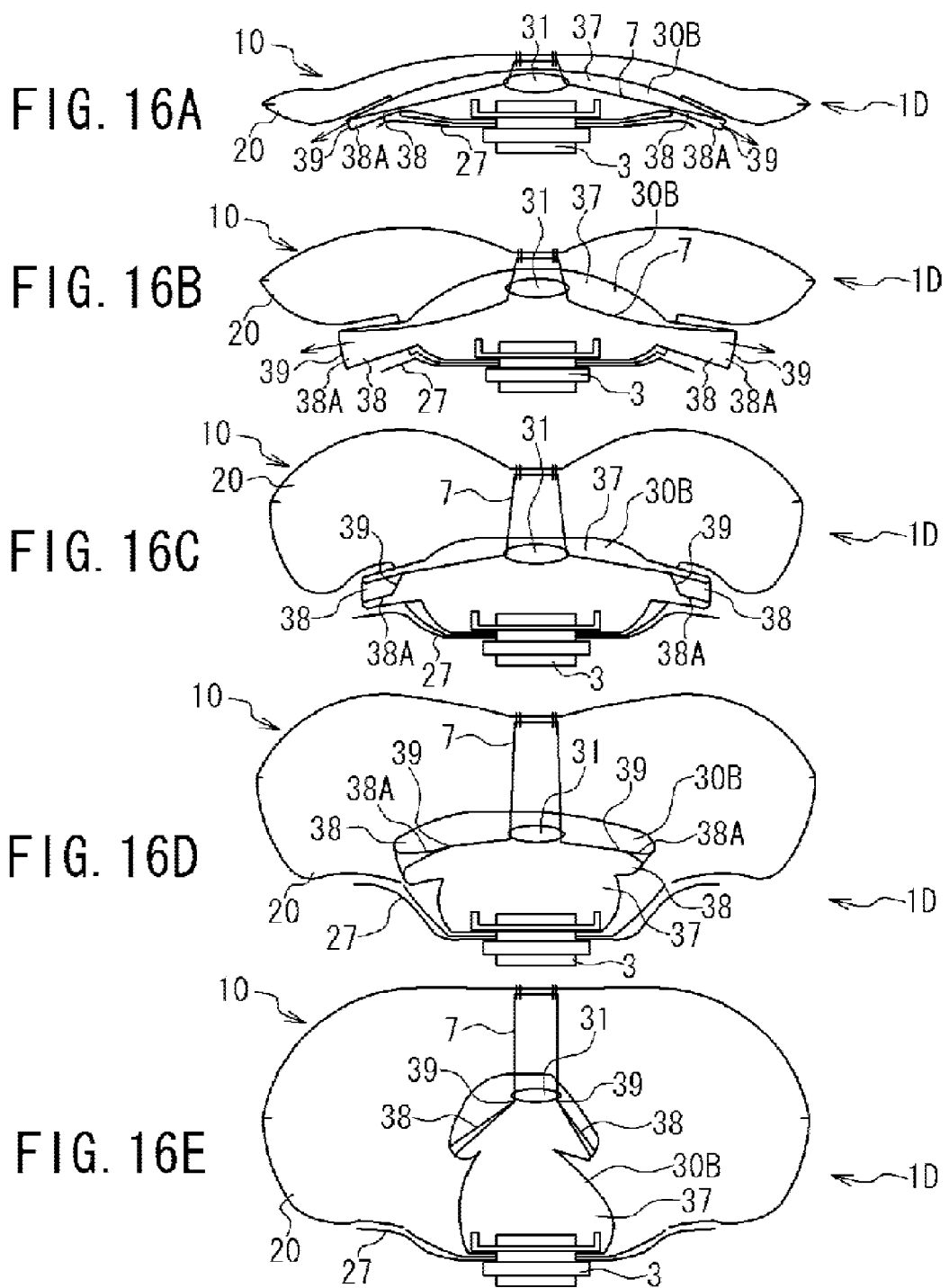
FIG. 16 includes cross-sectional views illustrating, in sequence, stages of inflation and deployment of the airbag.

FIG. 16 includes cross-sectional views illustrating, in sequence, stages of inflation and deployment of the airbag 10.

Note that the airbag 10 inflates and deploys through basically the same process as the first embodiment. Hence, herein, inflation and deployment of the airbag 10 will be described, focusing on a process different from the already described process.

At an early stage of deployment of the airbag 10, first, the inner bag 30B inflates within the outer bag 20 (see FIG. 16A). The tubular inflation portions 38 inflate from portions located inside the outer bag 20 to the ends 38A located outside the outer bag 20. The tubular inflation portions 38 expand the passing holes 25 etc. in the outer bag 20. The discharge ports 39 in the tubular inflation portions 38 are opened (see FIG. 16B). The inner bag 30B directly discharges the gas generated by the inflator 3 through the discharge ports 39 in the tubular inflation portions 38. The gas inside the inner bag 30B is discharged outside the outer bag 20.

The outer bag 20 starts to inflate with the gas supplied through the flow port 31 provided in the inner bag 30B. Due to the connecting member 7 being drawn out of the inner bag 30B, the front surface of the outer bag 20 is moved in the occupant direction. The tubular inflation portions 38 are drawn into the inner bag 30B by the connecting member 7 and are reversed (see FIG. 16C). The discharge ports 39 are closed. The discharge of the gas through the discharge ports 39 is stopped. The gas inside the outer bag 20 is discharged outside the outer bag 20 through the vent holes 21 and the through-holes 27A.

The tubular inflation portions 38 are pulled by the connecting member 7 and move out of the reinforcing cover 27 (into the outer bag 20). Then, the tubular inflation portions 38 are drawn into the outer bag 20 by the connecting member 7. The tubular inflation portions 38 move out of the reinforcing cover 27 (see FIG. 16D). As a result, the reinforcing cover 27 comes into tight contact with the rear surface of the outer bag 20. The through-holes 27A in the reinforcing cover 27 overlap the vent holes 21. The gas is discharged from the vent holes 21. The outer bag 20 fully inflates and deploys in front of the occupant 91 (see FIG. 16E). The airbag device 1D receives the occupant 91 with the airbag 10 at any stage of inflation. The gas in the outer bag 20 is discharged outside through the vent holes 21 and the through-holes 27A.

This airbag device 1D provides the same advantages as the airbag device 1A according to the first embodiment. Furthermore, with the discharge ports 39 provided at the ends 38A of the tubular inflation portions 38, the same advantages as the airbag device 1C according to the third embodiment are obtained. With the airbag device 1D, the occupant 91 in any state can be safely protected. By discharging the gas from the discharge ports 39, the occupant 91 in an OOP state can also be protected. Due to the force that draws the tubular inflation portions 38 into the outer bag 20, the connecting member 7 is inhibited from being drawn out. As a result, it is possible to reliably restrict, with the connecting member 7, the movement of the front surface of the outer bag 20.

Note that the ends 38A of the tubular inflation portions 38 may be disposed outside the outer bag 20 through the vent holes 21. By using the vent holes 21 as passing holes through which the ends 38A pass, the need to provide the passing holes 25 is eliminated. Therefore, effort and man-hours to provide the passing holes 25 can be reduced.

Fifth Embodiment

Figure 17:
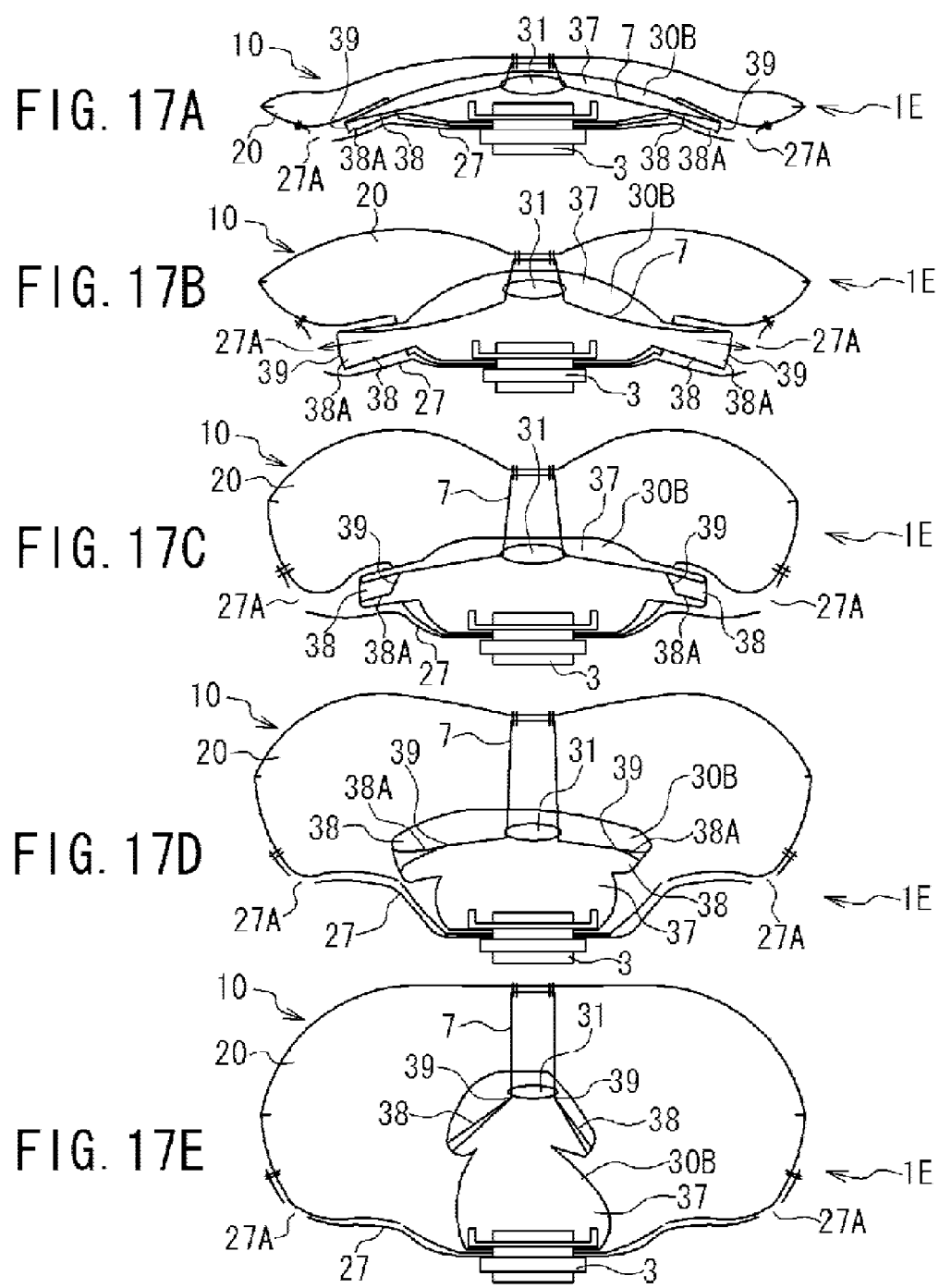
FIG. 17 includes diagrams illustrating an airbag device according to a fifth embodiment.

FIG. 17 includes diagrams illustrating an airbag device 1 according to a fifth embodiment (hereinbelow, an "airbag device 1E"). FIG. 17 includes cross-sectional views illustrating, in sequence, stages of inflation and deployment of the airbag 10.

In this airbag device 1E, part of the reinforcing cover 27 is different from that of the fourth embodiment. Except for the reinforcing cover 27, the airbag device 1E is the same as the airbag device 1D according to the fourth embodiment. The airbag 10 inflates and deploys through the same process as the fourth embodiment. Herein, the difference from the airbag device 1D will be described.

The side edges and ends of the reinforcing cover 27 are stitched to the rear base fabric piece 23 of the outer bag 20. The whole outer edges of the reinforcing cover 27 are joined to the outer bag 20. The space inside the reinforcing cover 27 communicates with the outside of the airbag 10 via the through-holes 27A. The through-holes 27A are provided at positions completely misaligned with the vent holes 21. Before the airbag 10 is inflated, the ends 38A of the tubular inflation portions 38 are disposed outside the outside the outer bag 20, between the reinforcing cover 27 and the outer bag 20 (see FIG. 17A). The ends 38A and the discharge ports 39 are disposed on the through-holes 27A or at positions near the through-holes 27A. The discharge ports 39 are disposed so as to face the through-holes 27A.

When the inner bag 30B inflates, the tubular inflation portions 38 inflate to the ends 38A. The discharge ports 39 are opened (see FIG. 17B). The inner bag 30B directly discharges the gas generated by the inflator 3 through the discharge ports 39. The discharged gas is discharged outside the outer bag 20 through the through-holes 27A in the reinforcing cover 27. The discharge ports 39 are drawn into the inner bag 30B by the connecting member 7 and are closed. The discharge of gas through the discharge ports 39 is stopped (see FIG. 17C). The gas in the outer bag 20 is discharged outside the outer bag 20 through the vent holes 21 and the through-holes 27A.

When the tubular inflation portions 38 are drawn into the inner bag 30B, the tubular inflation portions 38 move out of the reinforcing cover 27 (into the outer bag 20). The reinforcing cover 27 overlies the vent holes 21 (see FIG. 17D). The reinforcing cover 27 comes into tight contact with the rear surface of the outer bag 20. The reinforcing cover 27 overlies the vent holes 21 such that the through-holes 27A are shifted from the vent holes 21. The reinforcing cover 27 closes the vent holes 21. The through-holes 27A come into tight contact with the rear surface of the outer bag 20 and are closed. Subsequently, the outer bag 20 fully inflates and deploys in front of the occupant 91 (see FIG. 17E). The airbag device 1E receives the occupant 91 with the airbag 10 at any stage of inflation.

This airbag device 1E provides the same advantages as the airbag device 1D according to the fourth embodiment. The discharge of gas from the airbag 10 can be stopped after the airbag 10 inflates and deploys. Note that, by providing another vent hole at a position not covered by the reinforcing cover 27 of the outer bag 20, the amount of gas discharged from the airbag 10 may be adjusted.

Sixth Embodiment

Figure 18:
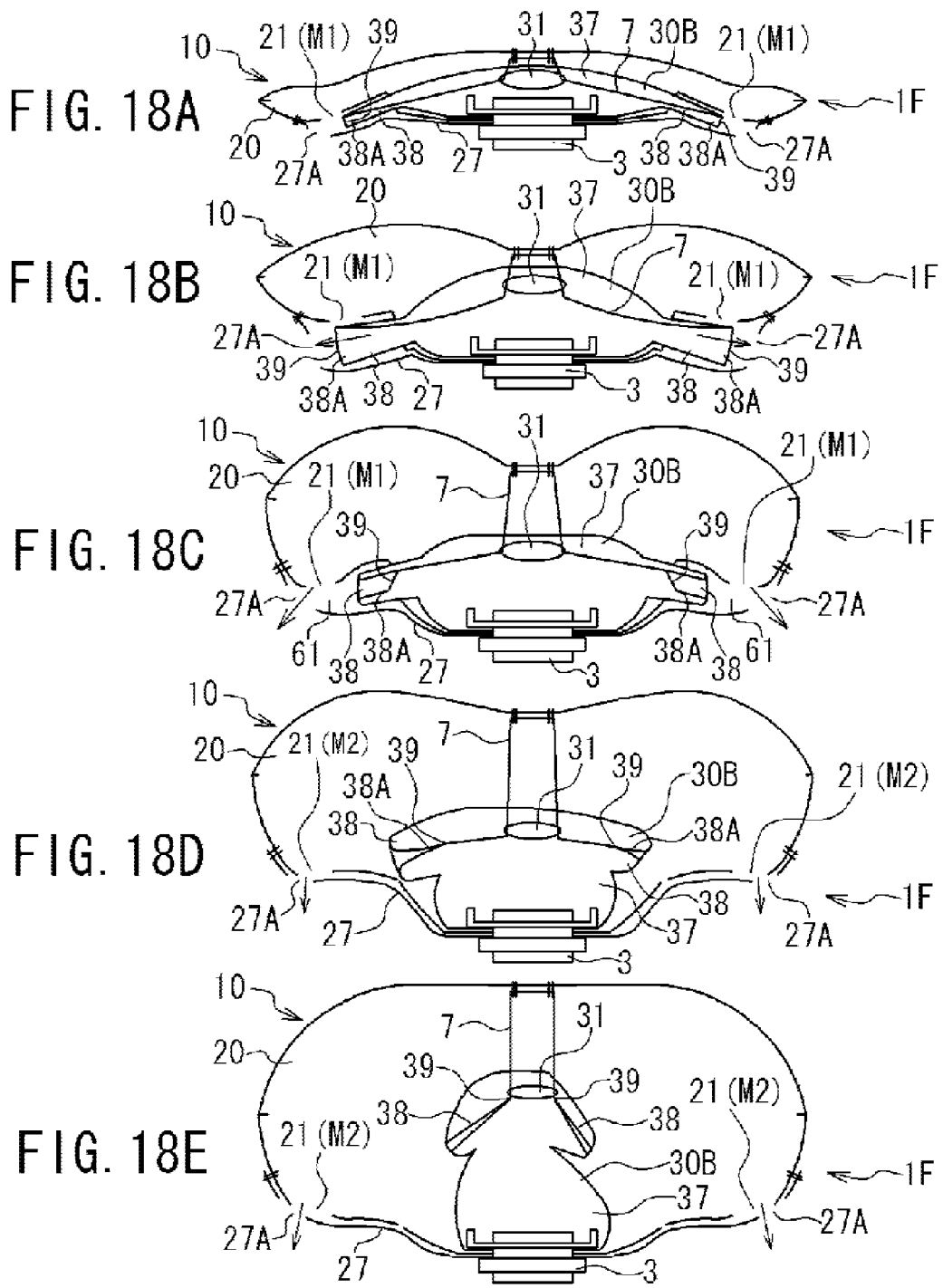
FIG. 18 includes diagrams illustrating an airbag device according to a sixth embodiment.

FIG. 18 includes diagrams illustrating an airbag device 1 according to a sixth embodiment (hereinbelow, an "airbag device 1F"). FIG. 18 includes cross-sectional views illustrating, in sequence, stages of inflation and deployment of the airbag 10.

In this airbag device 1F, part of the reinforcing cover 27 is different from that of the fifth embodiment. Herein, the difference from the airbag device 1E will be described.

The distance between the two through-holes 27A in the reinforcing cover 27 is almost the same as that between the two vent holes 21. The reinforcing cover 27 is stitched to the rear base fabric piece 23 of the outer bag 20 such that the through-holes 27A overlap the vent holes 21. At this time, the through-holes 27A are provided at positions shifted from the vent holes 21. When the reinforcing cover 27 comes into tight contact with the rear surface of the outer bag 20, the through-holes 27A overlap the vent holes 21 in a shifted manner. Because the vent holes 21 are partially closed by the peripheral portions of the through-holes 27A in the reinforcing cover 27, the opening area of the vent holes 21 is changed by the reinforcing cover 27. Thus, the opening area of the vent holes 21 is changed to the second area M2, which is smaller than the first area M1.

When the inner bag 30B inflates (see FIG. 18A), the discharge ports 39 are opened. The tubular inflation portions 38 discharge the gas through the discharge ports 39 (see FIG. 18B). The discharged gas is discharged outside the outer bag 20 through the through-holes 27A in the reinforcing cover 27. The discharge ports 39 are drawn into the inner bag 30B by the connecting member 7 and are closed. The discharge of gas through the discharge ports 39 is stopped (see FIG. 18C). At this time, the inflated tubular inflation portions 38 form spaces 61 between the reinforcing cover 27 and the vent holes 21, through which the gas flows. The gas in the outer bag 20 is discharged outside through the vent holes 21 and the through-holes 27A, which have the first area M1.

The ends 38A of the tubular inflation portions 38 gradually move away from the vent holes 21. The spaces 61 are narrowed. The reinforcing cover 27 gradually approaches the vent holes 21. As the through-holes 27A in the reinforcing cover 27 approach the vent holes 21, the gas becomes gradually less likely to be discharged from the vent holes 21. The amount of gas discharged from the vent holes 21 continuously decreases. When the tubular inflation portions 38 are drawn into the inner bag 30B, the tubular inflation portions 38 move out of the reinforcing cover 27. The reinforcing cover 27 overlies the vent holes 21 (see FIG. 18D). The reinforcing cover 27 comes into tight contact with the rear surface of the outer bag 20. The through-holes 27A overlap the vent holes 21. The reinforcing cover 27 changes the opening area of the vent holes 21 with the through-holes 27A overlapping the vent holes 21. The opening area of the vent holes 21 is changed to the second area M2, which is smaller than the first area M1. Subsequently, the outer bag 20 fully inflates and deploys in front of the occupant 91 (see FIG. 18E). The airbag device 1F receives the occupant 91 with the airbag 10 at any stage of inflation.

This airbag device 1F provides the same advantages as the airbag device 1D according to the fourth embodiment. Furthermore, as in the airbag device 1C according to the third embodiment, the opening area of the vent holes 21 can be changed with the through-holes 27A in the reinforcing cover 27. Therefore, the amount of gas discharged from the vent holes 21 can be changed. It is also possible to gradually change the amount of gas discharged from the vent holes 21. Accordingly, an appropriate amount of gas discharge for each stage of inflation of the airbag 10 is ensured. The airbag 10 exhibits appropriate impact absorbing properties.

Seventh Embodiment

Figure 19:
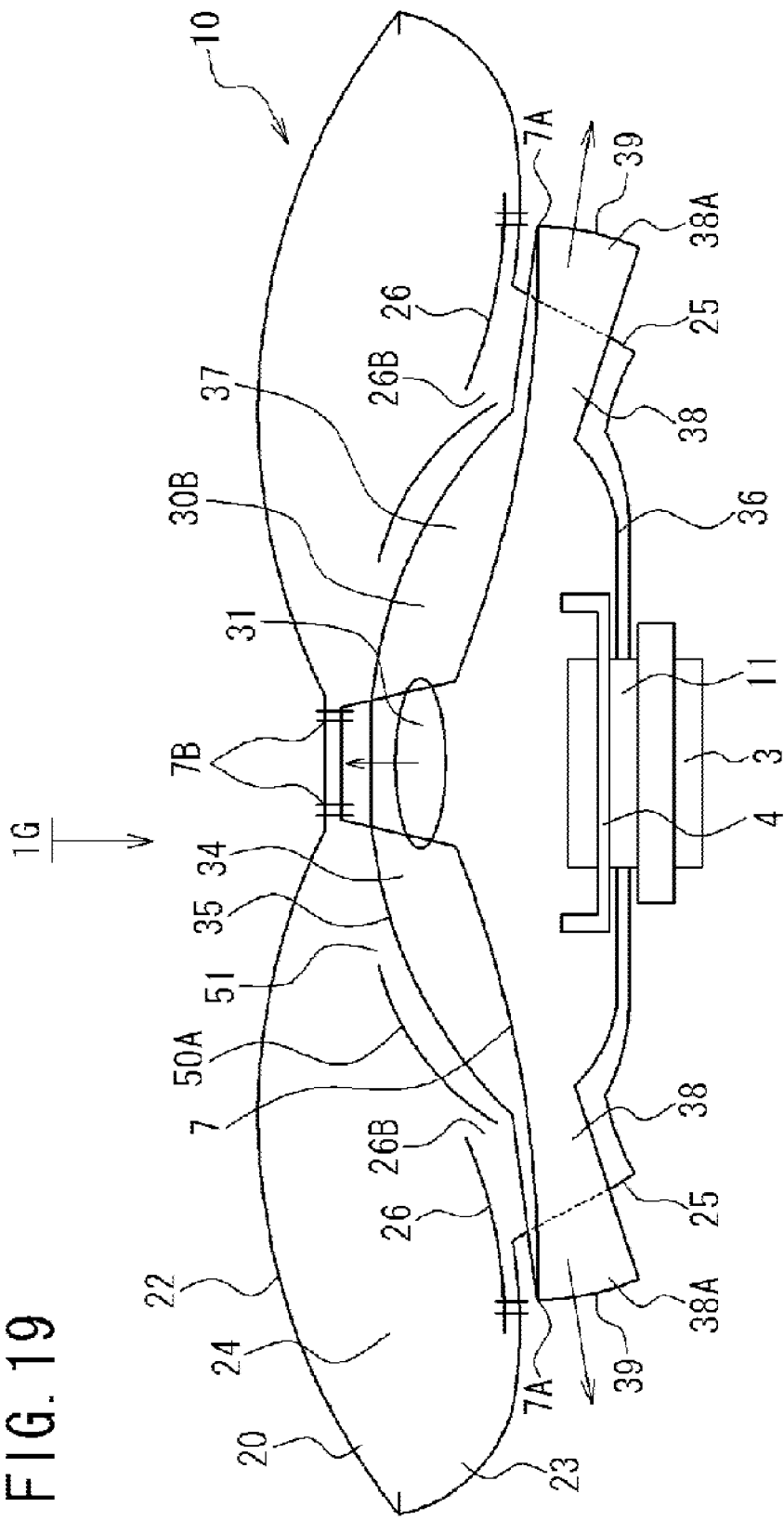
FIG. 19 illustrates an airbag device according to a seventh embodiment.
Figure 20:
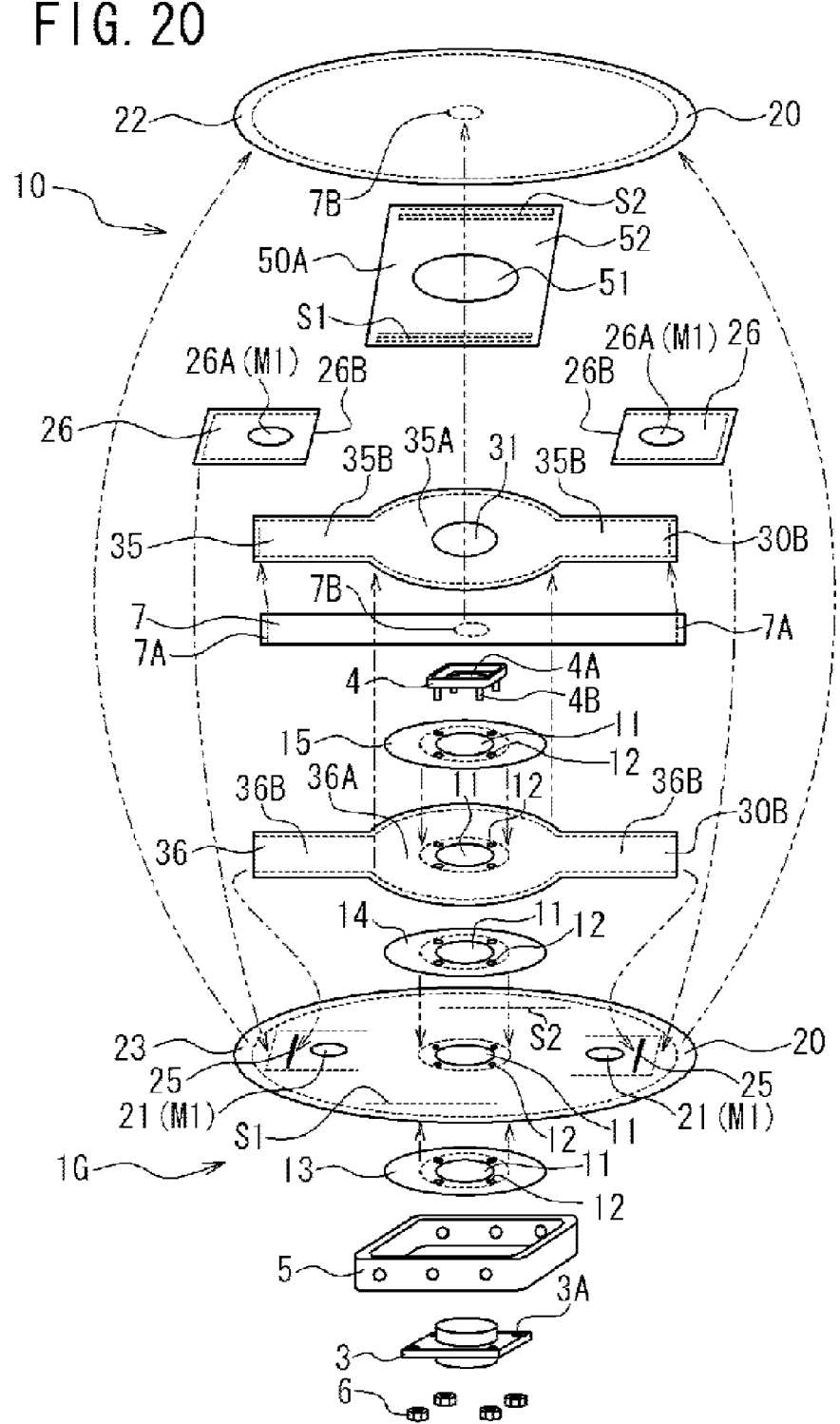
FIG. 20 is an exploded perspective view of the airbag device in FIG. 19.

FIG. 19 illustrates an airbag device 1 according to a seventh embodiment (hereinbelow, an "airbag device 1G"). FIG. 19 schematically illustrates the airbag device 1G as viewed from the arrow X direction in FIG. 1. Furthermore, FIG. 19 illustrates the airbag 10 at an early stage of deployment in cross-section. FIG. 20 is an exploded perspective view of the airbag device 1G in FIG. 19. FIG. 20 illustrates components of the airbag device 1G spaced apart in the up-down direction. FIG. 20 also shows, with arrows, the relationship between components to be combined and the positions where the components are to be combined. FIGS. 19 and 20 respectively correspond to FIGS. 14 and 15 described in the fourth embodiment.

This airbag device 1G differs from the airbag device 1D according to the fourth embodiment in the way of arranging the tubular inflation portions 38. Furthermore, the configuration of the outer bag 20 is partially changed. Herein, the same components as the airbag device 1D described above will be called by the same names and denoted by the same reference numerals, and the descriptions thereof will be omitted. The difference regarding the tubular inflation portions 38 and the outer bag 20 will be described in detail below.

As illustrated in the figures, the airbag 10 includes the inner bag 30B, which has the discharge ports 39, and the restraint member 50A, which has no through-holes 53. The outer bag 20 has vent hole covers (hereinbelow, "covers") 26. The covers 26 are provided in the outer bag 20, instead of the reinforcing cover 27 provided outside the outer bag 20. The covers 26 are inside covers provided in the outer bag 20. The covers 26 have through-holes 26A through which gas passes. The covers 26 overlie the vent holes 21. The covers 26 are formed of rectangular base fabric pieces and are disposed on the peripheral portions of the vent holes 21. The covers 26 are disposed so as to cover the vent holes 21 and the passing holes 25. The outer edges of the covers 26 are joined to the inner surface of the rear base fabric piece 23. However, the portions of the covers 26 on the inner bag 30B side are not joined thereto. In this manner, unjoined portions 26B are provided on the covers 26.

The through-holes 26A in the covers 26 have the same configuration as the through-holes 27A in the reinforcing cover 27. More specifically, the through-holes 26A are circular holes and have, like the vent holes 21 in the outer bag 20, the first area M1. The covers 26 are stitched to the rear base fabric piece 23 of the outer bag 20 such that the through-holes 26A overlap the vent holes 21. At this time, the through-holes 26A are provided at positions aligned with the vent holes 21. When the covers 26 come into tight contact with the rear surface of the outer bag 20, the through-holes 26A overlap the vent holes 21.

The passing holes 25 are provided in the rear base fabric piece 23, at positions covered by the covers 26. The passing holes 25 are formed in the rear base fabric piece 23, on the outer side of the two vent holes 21. The restraint member 50A is disposed so as to cross the inner bag 30B. The restraint member 50A is stitched to the rear base fabric piece 23 of the outer bag 20 at positions other than the positions where the vent holes 21 are provided. The ball-shaped inflation portion 37 of the inner bag 30B is covered by the restraint member 50A. The covers 26 are located on the outer side of the restraint member 50A. The tubular inflation portions 38 are disposed in the covers 26 through the side openings of the restraint member 50A.

Before the airbag 10 is inflated, the ends 38A of the tubular inflation portions 38 are inserted into the covers 26 through the unjoined portions 26B (between the outer bag 20 and the covers 26). The ends 38A are disposed outside the outer bag 20 through the passing holes 25. Thus, the discharge ports 39 in the tubular inflation portions 38 are disposed outside the outer bag 20. The inner bag 30B discharges the gas therein outside the outer bag 20 through the discharge ports 39.

Before the airbag 10 is inflated, the tubular inflation portions 38 are disposed in the covers 26. The tubular inflation portions 38 inflate and contract in the covers 26. When the tubular inflation portions 38 are drawn into the inner bag 30B by the connecting member 7, the tubular inflation portions 38 are pulled by the connecting member 7. As a result, the tubular inflation portions 38 are drawn into the outer bag 20 through the passing holes 25 and the unjoined portions 26B. Due to the connecting member 7 being drawn out of the inner bag 30B, the ends 38A of the tubular inflation portions 38 are drawn into the outer bag 20. The tubular inflation portions 38 move out of the covers 26. The covers 26 come into tight contact with the rear surface of the outer bag 20. Furthermore, the covers 26 overlie the vent holes 21. At this time, the through-holes 26A overlap the vent holes 21. The gas is discharged from the vent holes 21. The passing holes 25 are closed by the covers 26.

Next, a manufacturing process of the airbag device 1G (see FIG. 20) will be described.

The outer bag 20 is formed by the same process as the first embodiment. However, before the base fabric pieces 22 and 23 constituting the outer bag 20 are stitched together (in FIG. 20, dashed lines indicate stitching portions), ends of the restraint member 50A are stitched to the rear base fabric piece 23 (joint portions S1 and S2). The two covers 26 are stitched to the rear base fabric piece 23. The inner bag 30B is formed by the same process as the third embodiment. Next, the inner bag 30B is inserted into the outer bag 20. The inner bag 30B is arranged between the rear base fabric piece 23 of the outer bag 20 and the restraint member 50A. The connecting member 7 is stitched to the front base fabric piece 22 of the outer bag 20. The two ends 38A of the tubular inflation portions 38 are inserted into the unjoined portions 26B of the covers 26. The ends 38A are disposed outside the outer bag 20 through the passing holes 25. Then, the airbag device 1G is formed in the same way as the first embodiment. The airbag device 1G inflates and deploys the airbag 10 with the gas generated by the inflator 3.

FIG. 21 includes cross-sectional views illustrating, in sequence, stages of inflation and deployment of the airbag 10.

Note that the airbag 10 inflates and deploys through basically the same process as the fourth embodiment. Hence, herein, inflation and deployment of the airbag 10 will be described, focusing on a process different from the already described process.

The inner bag 30B inflates between the restraint member 50A and the rear surface of the outer bag 20 (see FIG. 21A). When the inner bag 30B inflates, the discharge ports 39 are opened. The tubular inflation portions 38 discharge the gas outside the outer bag 20 through the discharge ports 39 (see FIG. 21B). The discharge ports 39 are drawn into the inner bag 30B by the connecting member 7 and are closed. The discharge of gas through the discharge ports 39 is stopped (see FIG. 21C). The gas in the outer bag 20 is discharged outside the outer bag 20 through the through-holes 26A and the vent holes 21.

When the tubular inflation portions 38 are drawn into the inner bag 30B, the tubular inflation portions 38 move out of the covers 26. The covers 26 overlie the vent holes 21 (see FIG. 21D). Due to the tension caused by the inflation of the outer bag 20 and the internal pressure of the outer bag 20, the covers 26 come into tight contact with the rear surface of the outer bag 20. The through-holes 26A overlap the vent holes 21. The restraint member 50A is provided at a position away from the vent holes 21 and does not affect the vent holes 21. Therefore, the vent holes 21 discharge gas without being closed by the restraint member 50A. The inner bag 30B is pulled by the connecting member 7 and passes through the opening 51 in the occupant direction. Then, the outer bag 20 fully inflates and deploys in front of the occupant 91 (see FIG. 21E). The airbag device 1G receives the occupant 91 with the airbag 10 at any stage of inflation.

This airbag device 1G provides the same advantages as the airbag device 1A according to the first embodiment. Furthermore, because the restraint member 50A restrains the inflation of the inner bag 30B, movement of the front surface of the outer bag 20 can be more reliably restricted. Because of the discharge ports 39 provided at the ends 38A of the tubular inflation portions 38, the same advantages as the airbag device 1C according to the third embodiment are obtained. With the airbag device 1G, the occupant 91 in any state can be safely protected. By discharging the gas from the discharge ports 39, the occupant 91 in an OOP state can also be protected. Due to the force that draws the tubular inflation portions 38 into the outer bag 20, the connecting member 7 is inhibited from being drawn out. As a result, it is possible to reliably restrict, with the connecting member 7, the movement of the front surface of the outer bag 20.

Note that the through-holes 26A in the covers 26 may be provided at positions completely misaligned with the vent holes 21. In such a case, the covers 26 overlie the vent holes 21 such that the through-holes 26A are shifted from the vent holes 21. The covers 26 close the vent holes 21. The through-holes 26A come into tight contact with the rear surface of the outer bag 20 and are closed. Furthermore, the through-holes 26A may be provided so as to be shifted from the vent holes 21. The covers 26 change the opening area of the vent holes 21 with the through-holes 26A overlapping the vent holes 21. The opening area of the vent holes 21 is changed to the second area M2, which is smaller than the first area M1. The ends 38A of the tubular inflation portions 38 may be disposed outside the outer bag 20 through the vent holes 21. In such a case, there is no need to provide the passing holes 25 in the outer bag 20.

Eighth Embodiment

FIG. 22 includes diagrams illustrating an airbag device 1 according to an eighth embodiment (hereinbelow, an "airbag device 1H"). FIG. 22 includes cross-sectional views illustrating, in sequence, stages of inflation and deployment of the airbag 10.

This airbag device 1H differs from the airbag device 1G according to the seventh embodiment in the way of arranging the inner bag 30B. Furthermore, the outer bag 20 is partially changed. Herein, the same components as the airbag device 1G described above will be called by the same names and denoted by the same reference numerals, and the descriptions thereof will be omitted. The difference regarding the inner bag 30B and the outer bag 20 will be described in detail below.

The outer bag 20 does not have passing holes 25. Only the vent holes 21 are provided in the rear base fabric piece 23, at positions covered by the covers 26. The covers 26 are stitched to the rear base fabric piece 23 such that the through-holes 26A overlap the vent holes 21. At this time, the through-holes 26A are provided at positions shifted from the vent holes 21. When the covers 26 come into tight contact with the rear surface of the outer bag 20, the through-holes 26A overlap the vent holes 21 in a shifted manner. Because the vent holes 21 are partially closed by the peripheral portions of the through-holes 26A in the covers 26, the opening area of the vent holes 21 is changed by the covers 26. Thus, the opening area of the vent holes 21 is changed to the second area M2, which is smaller than the first area M1.

Before the airbag 10 is inflated, the ends 38A of the tubular inflation portions 38 are disposed in the outer bag 20, between the covers 26 and the outer bag 20 (see FIG. 22A). The ends 38A and the discharge ports 39 are disposed on the vent holes 21 or at positions near the vent holes 21. The discharge ports 39 are disposed so as to face the vent holes 21.

When the inner bag 30B inflates, the tubular inflation portions 38 inflate to the ends 38A. The discharge ports 39 are opened (see FIG. 22B). The inner bag 30B directly discharges the gas generated by the inflator 3 through the discharge ports 39. The discharged gas is discharged outside the outer bag 20 through the vent holes 21. The discharge ports 39 are drawn into the inner bag 30B by the connecting member 7 and are closed. The discharge of gas through the discharge ports 39 is stopped (see FIG. 22C). At this time, the inflated tubular inflation portions 38 form spaces 62 between the covers 26 and the vent holes 21, through which the gas flows. The gas in the outer bag 20 is discharged outside through the through-holes 26A and the vent holes 21, which have the first area M1.

The ends 38A of the tubular inflation portions 38 gradually move away from the vent holes 21. The spaces 62 are narrowed. The covers 26 gradually approach the vent holes 21. As the through-holes 26A in the covers 26 approach the vent holes 21, the gas becomes gradually less likely to be discharged from the vent holes 21. The amount of gas discharged from the vent holes 21 continuously decreases. When the tubular inflation portions 38 are drawn into the inner bag 30B, the tubular inflation portions 38 move out of the covers 26. The covers 26 overlie the vent holes 21 (see FIG. 22D). The covers 26 come into tight contact with the rear surface of the outer bag 20. The through-holes 26A overlap the vent holes 21. The covers 26 change the opening area of the vent holes 21 with the through-holes 26A overlapping the vent holes 21. The opening area of the vent holes 21 is changed to the second area M2, which is smaller than the first area M1. Subsequently, the outer bag 20 fully inflates and deploys in front of the occupant 91 (see FIG. 22E). The airbag device 1H receives the occupant 91 with the airbag 10 at any stage of inflation.

This airbag device 1H provides the same advantages as the airbag device 1G according to the seventh embodiment. Furthermore, as in the airbag device 1C according to the third embodiment, the opening area of the vent holes 21 can be changed with the through-holes 26A in the covers 26. Thus, it is possible to change the amount of gas discharged from the vent holes 21. It is also possible to gradually change the amount of gas discharged from the vent holes 21. Accordingly, an appropriate amount of gas can be discharged at any stage of inflation of the airbag 10. The airbag 10 exhibits appropriate impact absorbing properties.

Ninth Embodiment

FIG. 23 includes diagrams illustrating an airbag device 1 according to a ninth embodiment (hereinbelow, an "airbag device 1I"). FIG. 23 includes cross-sectional views illustrating, in sequence, stages of inflation and deployment of the airbag 10.

This airbag device 1I differs from the airbag device 1H according to the eighth embodiment in the way of arranging the inner bag 30A. Furthermore, the outer bag 20 is partially changed. Herein, the difference from the airbag device 1H will be described.

As illustrated in the figure, the airbag 10 has the inner bag 30A, which has no discharge ports 39. The covers 26 on the outer bag 20 are stitched to the rear base fabric piece 23 of the outer bag 20 such that the through-holes 26A overlap the vent holes 21. The through-holes 26A are provided at positions aligned with the vent holes 21. Before the airbag 10 is inflated, the ends 38A of the tubular inflation portions 38 are disposed in the outer bag 20, between the covers 26 and the outer bag 20 (see FIG. 23A). Inside the covers 26, the tubular inflation portions 38 are disposed on the vent holes 21. The tubular inflation portions 38 cover the whole vent holes 21. The vent holes 21 are closed by the tubular inflation portions 38.

When the inner bag 30A inflates, the tubular inflation portions 38 inflate to the ends 38A. The tubular inflation portions 38 inside the covers 26 close the vent holes 21 (see FIG. 23B). The tubular inflation portions 38 prevent the gas from being discharged from the vent holes 21. When the tubular inflation portions 38 move out of the covers 26, the vent holes 21 are opened (see FIG. 23C). Due to the movement of the tubular inflation portions 38, the opening area of the vent holes 21 gradually increases. The gas in the outer bag 20 is discharged outside the outer bag 20 through the through-holes 26A and the vent holes 21.

When the tubular inflation portions 38 are drawn into the inner bag 30A, the covers 26 overlie the vent holes 21 (see FIG. 23D). The covers 26 come into tight contact with the rear surface of the outer bag 20. The through-holes 26A overlap the vent holes 21. The gas is discharged from the vent holes 21 that are full-open. The outer bag 20 fully inflates and deploys in front of the occupant 91 (see FIG. 23E). The airbag device 1I receives the occupant 91 with the airbag 10 at any stage of inflation.

This airbag device 1I provides the same advantages as the airbag device 1G according to the seventh embodiment. Because the vent holes 21 are closed by the tubular inflation portions 38 at an early stage of deployment of the airbag 10, leakage and loss of the gas to be supplied to the outer bag 20 can be prevented. Accordingly, gas can be efficiently used. Because this enables to reduce the size and output of the inflator 3, the costs of the airbag device 1I can be reduced. When the tubular inflation portions 38 move out of the covers 26, the vent holes 21 are opened. Thereafter, discharge of gas from the vent holes 21 becomes possible. The optimum opening area of the vent holes 21 in the airbag 10 is ensured. The impact to the occupant is reduced by the airbag 10.

For example, if the capacity of the outer bag 20 is reduced or the size of the vent holes 21 is reduced to enable efficient use of the gas, the impact absorbing properties of the airbag 10 may be affected. In contrast, with the airbag device 1I, sufficient capacity of the outer bag 20 and sufficient size of the vent holes 21 can be ensured. The airbag 10 exhibits appropriate impact absorbing properties according to the capacity of the airbag 10 and the amount of gas discharged from the vent holes 21.

Tenth Embodiment

FIG. 24 includes diagrams illustrating an airbag device 1 according to a tenth embodiment (hereinbelow, an "airbag device 1J"). FIG. 24 includes cross-sectional views illustrating, in sequence, stages of inflation and deployment of the airbag 10.

This airbag device 1J differs from the airbag device 1I according to the ninth embodiment in the way of connecting the connecting member 7. Herein, the difference from the airbag device 1I will be described.

As illustrated in the figure, the connecting position of the connecting member 7 is shifted from the center of the outer bag 20 in a predetermined direction (in the figure, to the left). The connecting member 7 is connected to the front surface of the outer bag 20 through the flow port 31. The connecting member 7 is connected to the front surface of the outer bag 20, at a position shifted from the center. When the inner bag 30A inflates (see FIG. 24A), the tubular inflation portions 38 inflate to the ends 38A (see FIG. 24B). The outer bag 20 starts to inflate with the gas supplied through the flow port 31 in the inner bag 30A. At this time, compared with a portion of the outer bag 20 to which the connecting member 7 is connected, a portion on the other side (the right side in FIG. 24B) is less likely to be restricted by the connecting member 7. The portion of the outer bag 20 that is less likely to be restricted inflates to a larger size than the other portion. A large amount of gas is supplied to the portion of the outer bag 20 that inflates to a larger size, i.e., a preferential inflation portion Y. The preferential inflation portion Y preferentially inflates.

Figure 24A:
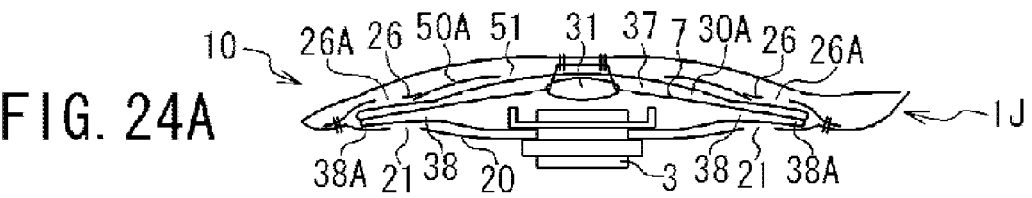
FIG. 24 includes diagrams illustrating an airbag device according to a tenth embodiment.
Figure 24B:
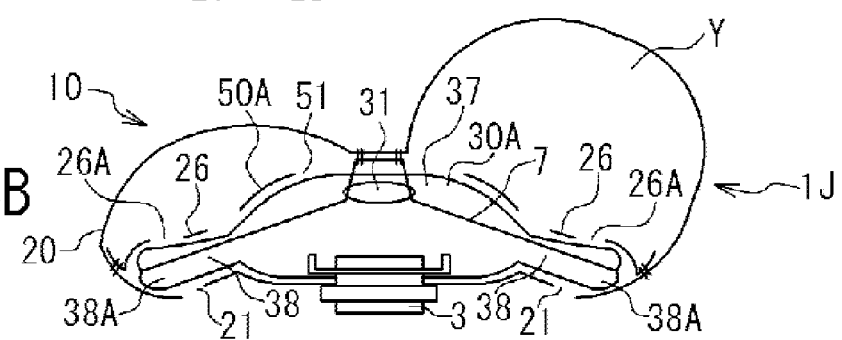
Figure 24C:
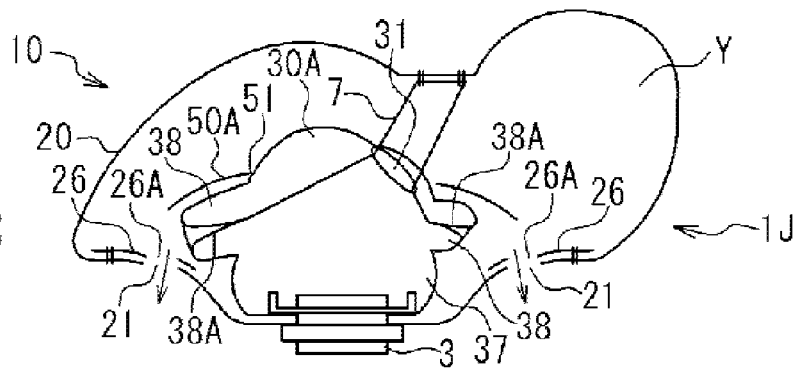
Figure 24D:
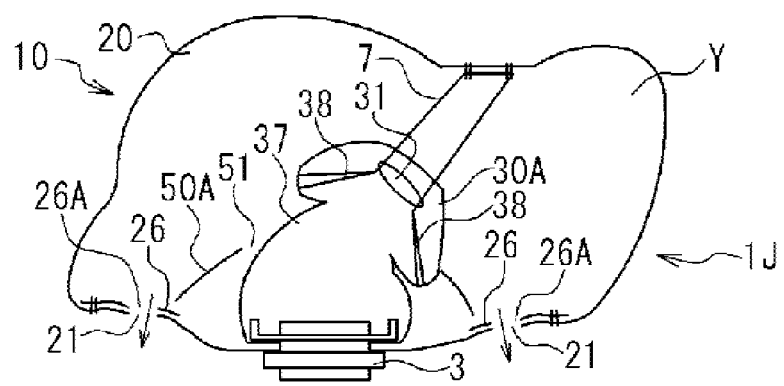
Figure 28A:
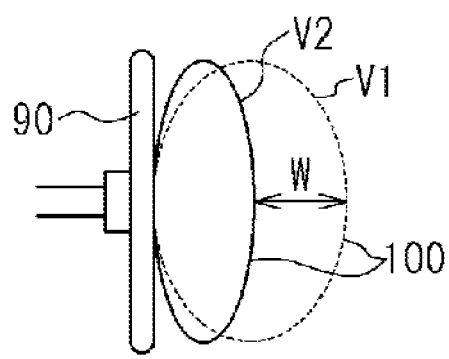
FIG. 28 includes side views illustrating a bouncing conventional airbag.
Figure 28B:
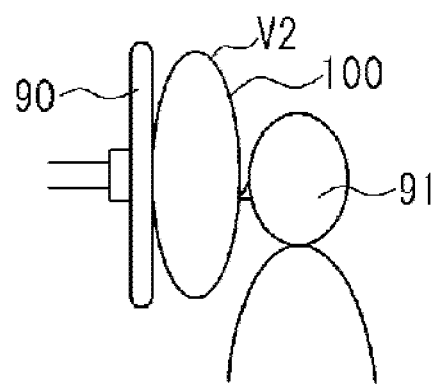

The outer bag 20 deploys in a predetermined direction according to the connecting position of the connecting member 7 (see FIG. 24C). When the connecting member 7 is pulled by the outer bag 20, the connecting member 7 is drawn out of the inner bag 30A in the direction in which the outer bag 20 deploys. The flow port 31 in the inner bag 30A faces the direction in which the connecting member 7 is drawn out, so as to follow the connecting member 7. The inner bag 30A discharges the gas from the flow port 31 in the direction in which the outer bag 20 deploys. Thus, inflation of the preferential inflation portion Y progresses. The outer bag 20 asymmetrically deploys. Then, the outer bag 20 fully inflates and deploys in front of the occupant 91 (see FIG. 24D).

This airbag device 1J provides the same advantages as the airbag device 1I according to the ninth embodiment. Furthermore, with the connecting member 7, the outer bag 20 can be asymmetrically deployed. Alternatively, the outer bag 20 can be deployed in a specific direction. By changing the position at which the connecting member 7 is connected to the outer bag 20, the manner of deployment of the outer bag 20 can be controlled. As a result, the airbag 10 can be inflated and deployed according to the position of the airbag device 1J or the position of the occupant 91 in the vehicle. For example, when the airbag device 1J is disposed in front of the passenger's seat, the preferential inflation portion Y of the outer bag 20 is provided on the occupant 91 side. By doing so, the airbag 10 is inflated and deployed toward the occupant 91.

Eleventh Embodiment

FIG. 25 includes diagrams illustrating an airbag device 1 according to an eleventh embodiment (hereinbelow, an "airbag device 1K"). FIG. 25 includes cross-sectional views illustrating, in sequence, stages of inflation and deployment of the airbag 10.

This airbag device 1K differs from the airbag device 1I according to the ninth embodiment in the way of arranging the inflator 3. Herein, the difference from the airbag device 1I will be described.

As illustrated in the figure, the flow port 31 in the inner bag 30A is larger than the inflator 3. As described above, the inflator 3 has a gas discharge port at one end. One end of the inflator 3 is disposed outside the inner bag 30A (inside the outer bag 20) through the flow port 31. The inflator 3 generates gas within the outer bag 20. The outer bag 20 is inflated with the gas (see FIG. 25A). Because the gas is not supplied to the inner bag 30A, the inner bag 30A is maintained in an uninflated shape. As the outer bag 20 inflates, the outer bag 20 pulls the connecting member 7. The connecting member 7 is drawn out of the inner bag 30A (see FIG. 25B). At this time, the connecting member 7 pulls the flow port 31 in the inner bag 30A, bringing the entire inflator 3 into the inner bag 30A (see FIG. 25C). The inner bag 30A inflates with the gas supplied from the inflator 3. Then, the airbag 10 inflates and deploys in the same manner as the ninth embodiment.

This airbag device 1K provides the same advantages as the airbag device 1I according to the ninth embodiment. Furthermore, the outer bag 20 inflates first, causing the connecting member 7 to bring the inflator 3 into the inner bag 30A. Thus, the gas generated by the inflator 3 can be reliably supplied to the inner bag 30A. It is also possible to smoothly deploy the airbag 10.

Twelfth Embodiment

FIG. 26 includes diagrams illustrating an airbag device 1 according to a twelfth embodiment (hereinbelow, an "airbag device 1L"). FIG. 26 includes cross-sectional views illustrating, in sequence, stages of inflation and deployment of the airbag 10.

This airbag device 1L differs from the airbag device 1G according to the seventh embodiment in the configuration of the outer bag 20. Herein, the difference from the airbag device 1G will be described.

As illustrated in the figure, the outer bag 20 has only the passing holes 25 at positions covered by the covers 26. The vent holes 21 are not provided in the outer bag 20 at positions covered by the covers 26. The covers 26 do not have the through-holes 26A. Furthermore, the restraint member 50A is not provided in the outer bag 20. The outer bag 20 has a closing member 70. The closing member 70 is provided on the outside of the outer bag 20. The outer bag 20 has the vent hole 21 at a position covered by the closing member 70 (herein, in the rear surface). The gas inside the outer bag 20 is discharged outside the outer bag 20 through the vent hole 21. The tubular inflation portions 38 are disposed in the covers 26. The ends 38A of the tubular inflation portions 38 are disposed outside the outer bag 20 through the passing holes 25.

The closing member 70 is formed of a belt-like base fabric piece and is disposed on the vent hole 21. The closing member 70 comes into tight contact with the outer surface of the outer bag 20. One end of the closing member 70 is joined to the outer bag 20, at a position near the vent hole 21. The other end of the closing member 70 is inserted into the corresponding cover 26 through the passing hole 25. The other end of the closing member 70 is disposed between the cover 26 and the tubular inflation portion 38. The other end of the closing member 70 is held by the inflated tubular inflation portion 38. In this state, the closing member 70 overlies the vent hole 21 and closes the vent hole 21. The closing member 70 stops discharge of gas from the vent hole 21.

When the inner bag 30B inflates, the tubular inflation portions 38 inflate within the covers 26 (see FIG. 26A). The ends 38A of the tubular inflation portions 38 open the discharge ports 39 at the outside of the outer bag 20. The closing member 70 is sandwiched and held between the inflated tubular inflation portion 38 and the cover 26. The vent hole 21 is maintained in a closed state by the closing member 70. Furthermore, the closing member 70 is held by the tubular inflation portion 38 drawn into the cover 26 (see FIGS. 26B and 26C). The discharge ports 39 at the ends 38A are drawn into the outer bag 20 by the connecting member 7 drawn out of the inner bag 30B and are closed.

When the tubular inflation portions 38 are drawn into the inner bag 30B, the tubular inflation portion 38 releases the closing member 70 (see FIG. 26D). Herein, when the tubular inflation portions 38 move out of the covers 26, the closing member 70 moves out of the space between the tubular inflation portion 38 and the cover 26. The closing member 70 moves out of the passing hole 25 without any resistance. Thus, the closing member 70 opens the vent hole 21. The closing member 70 moves away from the vent hole 21 due to the flow of the gas discharged from the vent hole 21. Then, the outer bag 20 fully inflates and deploys in front of the occupant 91 (see FIG. 26E). The gas in the outer bag 20 is discharged from the vent hole 21.

This airbag device 1L provides the same advantages as the airbag device 1G according to the seventh embodiment. Because the vent hole 21 is closed by the closing member 70 at an early stage of deployment of the airbag 10, leakage and loss of the gas supplied to the outer bag 20 can be prevented. Accordingly, the gas can be efficiently used. When the tubular inflation portions 38 are drawn into the inner bag 30B, the vent hole 21 is opened. Thereafter, discharge of gas from the vent hole 21 becomes possible. The optimum opening area of the vent hole 21 in the airbag 10 is ensured. The impact to the occupant is reduced by the airbag 10.

Herein, the closing member 70 is sandwiched and held between the cover 26 which constitute part of the outer bag and the tubular inflation portion 38. Alternatively, the closing member 70 may be sandwiched and held between the rear surface of the outer bag 20 and the cover 26. The inner bag 30B may be changed to the inner bag 30A, which has no discharge ports 39. In such a case, before the airbag 10 is inflated, the ends 38A of the tubular inflation portions 38 may be disposed inside the covers 26.

Thirteenth Embodiment

FIG. 27 includes diagrams illustrating an airbag device 1 according to a thirteenth embodiment (hereinbelow, an "airbag device 1M"). FIG. 27 includes cross-sectional views illustrating, in sequence, stages of inflation and deployment of the airbag 10.

This airbag device 1M differs from the airbag device 1A according to the first embodiment in the way of arranging the inner bag 30A. Furthermore, the configuration of the outer bag 20 is partially different. Herein, the difference from the airbag device 1A will be described.

As illustrated in the figure, the outer bag 20 has tubular gas paths 71. The gas paths 71 project into the outer bag 20. The gas paths 71 are formed of tubular base fabric pieces and are provided at two positions on the rear surface of the outer bag 20. Ends of each gas path 71 are open to the outside and inside of the outer bag 20. The gas paths 71 are gas discharge paths, through which the gas inside the outer bag 20 is discharged outside. The tubular inflation portions 38 of the inner bag 30 are disposed in the gas paths 71 projecting inward. The tubular inflation portions 38 inflate within the gas paths 71 and come into tight contact with the gas paths 71. Thus, the tubular inflation portions 38 close the gas paths 71 and retain the gas paths 71 to the inside of the outer bag 20.

When the inner bag 30A inflates (see FIG. 27A), the tubular inflation portions 38 inflate within the gas paths 71 (see FIG. 27B). The tubular inflation portions 38 retain the gas paths 71. The tubular inflation portions 38 prevent the gas paths 71 from being reversed. The gas paths 71 are closed by the inflated tubular inflation portions 38 (see FIG. 27C). The tubular inflation portions 38 are drawn into the inner bag 30A by the connecting member 7 and move into the outer bag 20 (see FIG. 27D). As a result, resistance of the tubular inflation portions 38 to the gas paths 71 is eliminated. Due to the gas pressure in the outer bag 20, the gas paths 71 start to be reversed.

In this manner, when the tubular inflation portions 38 are drawn into the inner bag 30A, the tubular inflation portions 38 move out of the gas paths 71, reversing the gas paths 71 (see FIG. 27E). The gas paths 71 are reversed due to the gas pressure and project to the outside of the outer bag 20. The gas paths 71 are opened to the outside of the outer bag 20. Then, the outer bag 20 fully inflates and deploys in front of the occupant 91. The gas in the outer bag 20 is discharged through the gas paths 71.

This airbag device 1M provides the same advantages as the airbag device 1A according to the first embodiment. Due to the force that draws the tubular inflation portions 38 into the outer bag 20, the connecting member 7 is inhibited from being drawn out. As a result, the movement of the front surface of the outer bag 20 can be reliably restricted by the connecting member 7. Because the gas paths 71 are closed by the inflated tubular inflation portions 38 at an early stage of deployment of the airbag 10, leakage and loss of the gas supplied to the outer bag 20 can be prevented. Accordingly, the gas can be efficiently used. When the tubular inflation portions 38 are drawn into the inner bag 30A, the gas paths 71 are opened. Thus, the gas can be discharged from the gas paths 71. By discharging the gas from the gas paths 71, the impact to the occupant is reduced. Note that the inner bag 30A may be changed to the inner bag 30B, which has the discharge ports 39.

In the airbag device 1 according to the above-described plurality of embodiments, the restraint member 50A may be provided to the airbag 10 that does not have the restraint member 50 for holding the inner bag 30. Conversely, the restraint member 50A may be omitted from the airbag 10 that has the restraint member 50A. In the airbag 10 with the inner bag 30B, which has the discharge ports 39, when there is no need to take measures against the occupant 91 in an OOP state, the inner bag 30B may be changed to the inner bag 30A, which has no discharge ports 39. In such a case, the gas is not discharged outside the outer bag 20, so the gas generated by the inflator 3 can be efficiently used. The airbag 10 quickly inflates and deploys.

REFERENCE SIGNS LIST

1: airbag device;
2: airbag cover;
3: inflator;
4: cushion ring;
5: reaction plate;
6: locknut;
7: connecting member;
10: airbag;
11: attachment opening;
12: insertion hole;
13: reinforcing fabric piece;
14: reinforcing fabric piece;
15: protection fabric piece;
20: outer bag;
21: vent hole;
22: front base fabric piece;
23: rear base fabric piece;
24: air chamber;
25: passing hole;
26: cover;
27: reinforcing cover;
30: inner bag;
31: flow port;
34: air chamber;
35: front base fabric piece;
36: rear base fabric piece;
37: ball-shaped inflation portion;
38: tubular inflation portion;
39: discharge port;
50: restraint member;
51: opening;

52: belt-shaped member;
53: through-hole;
60 to 62: space;
70: closing member;
71: gas path;
90: steering wheel;
91: occupant; and
92: driver's seat.

The invention claimed is:

1. An airbag device comprising:
an airbag that inflates and deploys with gas to protect an occupant in a vehicle; and
an inflator that supplies gas to the airbag,
wherein the airbag includes an outer bag that protects the occupant by inflation and deployment thereof, an inner bag that is disposed in the outer bag and accommodates the inflator, and a connecting member that is disposed in the inner bag,
wherein the inner bag inflates with the gas supplied from the inflator to become an inflated inner bag, and has a gas flow port to supply the gas to the outer bag and at least one tubular inflation portion protruding outward from the inner bag,
wherein the outer bag inflates with the gas supplied through the gas flow port provided in the inner bag to become an inflated outer bag,
wherein the connecting member is joined to an end of the tubular inflation portion and is connected to an inner surface of the outer bag, facing to the occupant through, the gas flow port, and
wherein, as the outer bag inflates, the connecting member is drawn out of the gas flow port of the inflated inner bag to thereby draw the end of the tubular inflation portion into the inner bag and restrict movement of the outer bag in an occupant direction.

2. The airbag device according to claim 1,
wherein, before the airbag is inflated, the end of the tubular inflation portion is disposed outside the outer bag through a passing hole provided in the outer bag, and the end of-the tubular inflation portion is drawn into the outer bag by the connecting member drawn out of the inner bag.

3. The airbag device according to claim 2,
wherein the inner bag has a discharge port at the end of the tubular inflation portion through which gas therein is discharged outside.

4. The airbag device according to claim 1,
wherein the outer bag has a tubular gas path that projects inward and is reversed and opened to the outside by a gas pressure, and
wherein the tubular inflation portion inflates within the inwardly projecting gas path and holds the gas path, and the tubular inflation portion moves out of the gas path and reverses the gas path when drawn into the inner bag.

5. An airbag device comprising:
an airbag that inflates and deploys with gas to protect an occupant in a vehicle; and
an inflator that supplies gas to the airbag,
wherein the airbag includes an inner bag that inflates with the gas supplied from the inflator to become an inflated inner bag and has a gas flow port, an outer bag that accommodates the inner bag and inflates with the gas supplied through the flow port provided in the inner bag to become an inflated outer bag, and a connecting member that is disposed in the inner bag and connects an inner surface of the inner bag and a front surface of the outer bag,
wherein, as the outer bag inflates, the connecting member is drawn out of the inflated inner bag and moves the front surface of the outer bag in an occupant direction,
wherein the airbag has a restraint member that restrains, within the outer bag, the inner bag inflating in the occupant direction, and
wherein the restraint member is smaller than the inflated inner bag in a deployed condition and has an opening through which the connecting member and the inner bag pass in the occupant direction.

6. The airbag device according to claim 5,
wherein the outer bag has a vent hole through which the gas therein is discharged outside, and
wherein the restraint member has a through-hole that overlaps the vent hole to change an opening area of the vent hole when the inner bag passes through the opening.

7. An airbag device comprising:
an airbag that inflates and deploys with gas to protect an occupant in a vehicle; and
an inflator that supplies gas to the airbag,
wherein the airbag includes an inner bag that inflates with the gas supplied from the inflator to become an inflated inner bag and has a gas flow port, an outer bag that accommodates the inner bag and inflates with the gas supplied through the flow port provided in the inner bag to become an inflated outer bag, and a connecting member that is disposed in the inner bag and connects an inner surface of the inner bag and a front surface of the outer bag,
wherein, as the outer bag inflates, the connecting member is drawn out of the inflated inner bag and moves the front surface of the outer bag in an occupant direction,
wherein the inner bag has a tubular inflation portion protruding outward,
wherein the connecting member is connected to the inside of the tubular inflation portion and draws the tubular inflation portion into the inner bag when the connecting member is drawn out of the inner bag,
wherein the outer bag has a vent hole through which the gas therein is discharged outside, and a vent hole cover that overlies the vent hole and has a through-hole through which the gas passes, and
wherein, before the airbag is inflated, the tubular inflation portion is disposed in the vent hole cover, and the tubular inflation portion moves out of the vent hole cover, making the vent hole cover overlie the vent hole, when drawn into the inner bag.

8. The airbag device according to claim 7,
wherein the vent hole cover overlies the vent hole such that the through-hole is shifted from the vent hole, thereby closing the vent hole.

9. The airbag device according to claim 7,
wherein the vent hole cover overlies the vent hole such that the through-hole overlaps the vent hole, thereby allowing the gas to be discharged from the vent hole.

10. The airbag device according to claim 9,
wherein the vent hole cover changes an opening area of the vent hole with the through-hole overlapping the vent hole.

11. The airbag device according to claim 7,
wherein the vent hole cover is disposed in the outer bag, and
wherein, before the airbag is inflated, an end of the tubular inflation portion is disposed in the outer bag, between the vent hole cover and the outer bag.

12. The airbag device according to claim 7,
wherein the vent hole cover is disposed outside the outer bag, and
wherein, before the airbag is inflated, an end of the tubular inflation portion is disposed outside the outer bag through a passing hole provided in the outer bag, between the vent hole cover and the outer bag.

13. The airbag device according to claim 7,
wherein the tubular inflation portion closes the vent hole when disposed in the vent hole cover and opens the vent hole when moving out of the vent hole cover.

14. An airbag device comprising:
an airbag that inflates and deploys with gas to protect an occupant in a vehicle; and
an inflator that supplies gas to the airbag,
wherein the airbag includes an inner bag that inflates with the gas supplied from the inflator to become an inflated inner bag and has a gas flow port, an outer bag that accommodates the inner bag and inflates with the gas supplied through the flow port provided in the inner bag to become an inflated outer bag, and a connecting member that is disposed in the inner bag and connects an inner surface of the inner bag and a front surface of the outer bag,
wherein, as the outer bag inflates, the connecting member is drawn out of the inflated inner bag and moves the front surface of the outer bag in an occupant direction,
wherein the inner bag has a tubular inflation portion protruding outward,
wherein the connecting member is connected to the inside of the tubular inflation portion and draws the tubular inflation portion into the inner bag when the connecting member is drawn out of the inner bag,
wherein the outer bag has a vent hole through which the gas therein is discharged outside, and a closing member that is held by the tubular inflation portion and closes the vent hole, and
wherein the closing member is sandwiched and held between the tubular inflation portion and the outer bag, and the closing member is released, opening the vent hole, when the tubular inflation portion is drawn into the inner bag.

* * * * *